(12) United States Patent
Shaikh et al.

(10) Patent No.: US 11,461,687 B1
(45) Date of Patent: Oct. 4, 2022

(54) AUTOMATED DATA MODELING FOR ABBREVIATIONS UTILIZING FUZZY REASONING LOGIC

(71) Applicant: The Travelers Indemnity Company, Hartford, CT (US)

(72) Inventors: Obaid Shaikh, Weatogue, CT (US); Ajay Srinivasulu, Manchester, CT (US); Madhavi Atluri, Glastonbury, CT (US); Sandhya Narayanamoorthy, South Windsor, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 290 days.

(21) Appl. No.: 16/896,715

(22) Filed: Jun. 9, 2020

(51) Int. Cl.
    *G06N 7/02*     (2006.01)
    *G06F 16/21*     (2019.01)
    *G06N 20/00*     (2019.01)

(52) U.S. Cl.
    CPC ............. *G06N 7/02* (2013.01); *G06F 16/212* (2019.01); *G06N 20/00* (2019.01)

(58) Field of Classification Search
    CPC ......... G06N 7/02; G06N 20/00; G06F 16/212
    See application file for complete search history.

(56) References Cited

U.S. PATENT DOCUMENTS

| 8,498,999 | B1* | 7/2013 | Bhalotia | G06F 16/24578 |
| | | | | 707/767 |
| 9,710,543 | B2* | 7/2017 | Redfern | G06F 16/3338 |
| 2008/0086297 | A1* | 4/2008 | Li | G06F 40/40 |
| | | | | 704/3 |
| 2016/0335244 | A1* | 11/2016 | Weisman | G06F 40/242 |

FOREIGN PATENT DOCUMENTS

| CN | 110705289 A | * | 1/2020 |
| JP | 2008204399 A | * | 9/2008 |

* cited by examiner

*Primary Examiner* — Hares Jami
(74) *Attorney, Agent, or Firm* — Cantor Colburn LLP

(57) ABSTRACT

A system includes a network interface configured to access an enterprise data warehouse and an enterprise abbreviation list that maps enterprise terms to abbreviations. A processing device can communicate with the network interface and a memory device that stores instructions to analyze the enterprise data warehouse to determine name attribute scores based on occurrences of the enterprise terms and the abbreviations in the enterprise data warehouse. Execution of the instructions can also generate a scoring summary of phrases, apply fuzzy reasoning logic to identify one or more relationship patterns and weights for the phrases including at least one shared word to produce training data for a data model associated with the enterprise data warehouse, and update the data model with a new abbreviated field name associated with a new field name based on identifying a closest match of the new field name with the training data.

24 Claims, 16 Drawing Sheets

FIG. 8

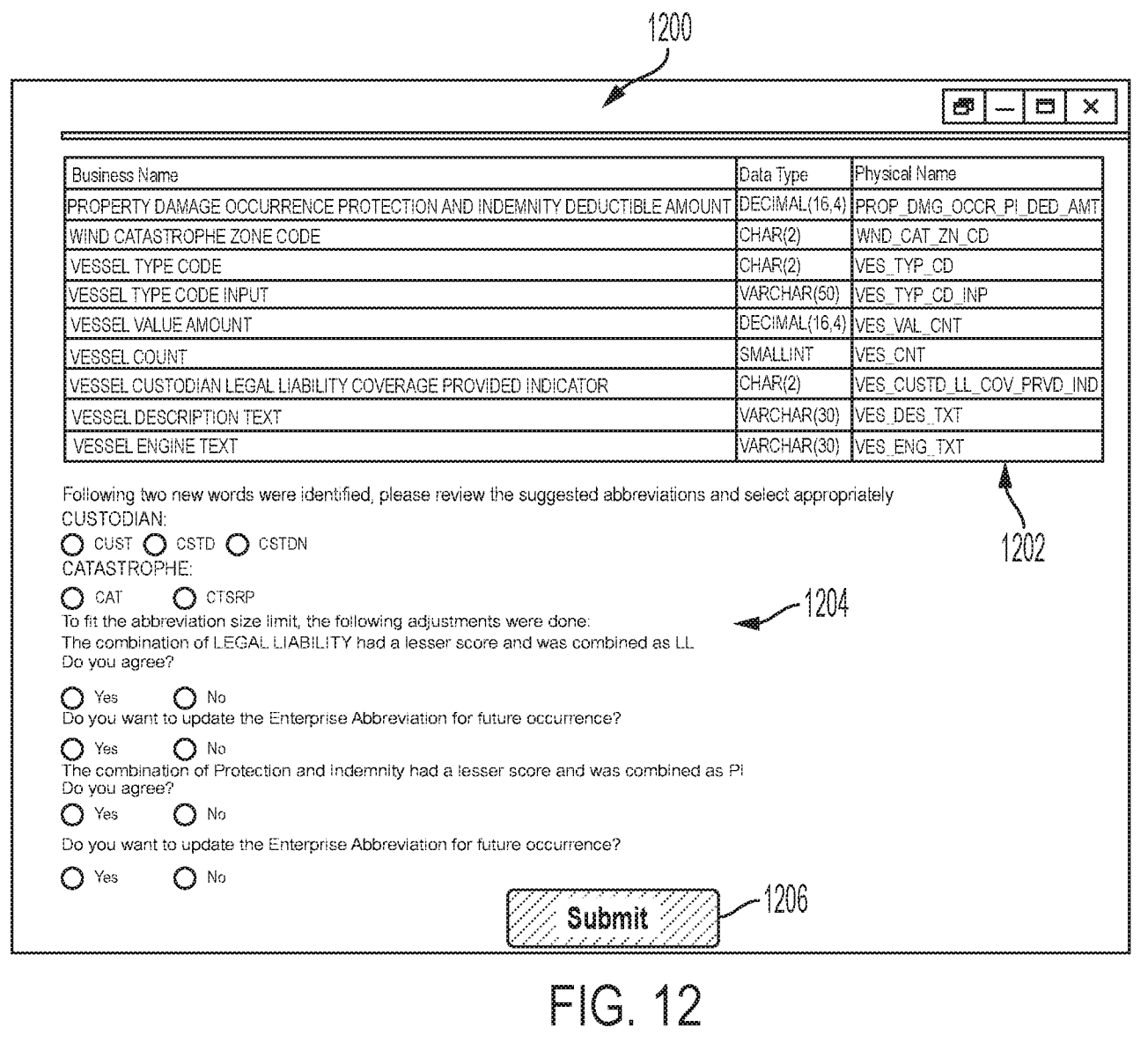

| Business Name | Data Type | Physical Name |
|---|---|---|
| PROPERTY DAMAGE OCCURRENCE PROTECTION AND INDEMNITY DEDUCTIBLE AMOUNT | DECIMAL(16,4) | PROP_DMG_OCCR_PI_DED_AMT |
| WIND CATASTROPHE ZONE CODE | CHAR(2) | WND_CAT_ZN_CD |
| VESSEL TYPE CODE | CHAR(2) | VES_TYP_CD |
| VESSEL TYPE CODE INPUT | VARCHAR(50) | VES_TYP_CD_INP |
| VESSEL VALUE AMOUNT | DECIMAL(16,4) | VES_VAL_CNT |
| VESSEL COUNT | SMALLINT | VES_CNT |
| VESSEL CUSTODIAN LEGAL LIABILITY COVERAGE PROVIDED INDICATOR | CHAR(2) | VES_CUSTD_LL_COV_PRVD_IND |
| VESSEL DESCRIPTION TEXT | VARCHAR(30) | VES_DES_TXT |
| VESSEL ENGINE TEXT | VARCHAR(30) | VES_ENG_TXT |

1202

Following two new words were identified, please review the suggested abbreviations and select appropriately
CUSTODIAN:
○ CUST  ○ CSTD  ○ CSTDN
CATASTROPHE:
○ CAT  ○ CTSRP
To fit the abbreviation size limit, the following adjustments were done:
The combination of LEGAL LIABILITY had a lesser score and was combined as LL.
Do you agree?
○ Yes  ○ No
Do you want to update the Enterprise Abbreviation for future occurrence?
○ Yes  ○ No
The combination of Protection and Indemnity had a lesser score and was combined as PI
Do you agree?
○ Yes  ○ No
Do you want to update the Enterprise Abbreviation for future occurrence?
○ Yes  ○ No

1204

[Submit] 1206

FIG. 12

AUTOMATED DATA MODELING FOR ABBREVIATIONS UTILIZING FUZZY REASONING LOGIC

BACKGROUND

Enterprise data warehouses can store a vast amount of data generated from multiple applications, files, and other sources. Various applications and associated databases can have locally defined rules and other constraints about how underlying data is managed and presented. Data modelers can manually develop data models by analyzing documents to understand data attributes and design coherent tables. As data models are developed, data modelers strive to adhere to enterprise modeling standards and maintain consistency across each application. As multiple data sources are modeled from across an enterprise, the process of merging data into an enterprise data warehouse can be time consuming, as mapping operations are manually determined to account for differences in formatting, field names, data types, naming conventions, and the like. Merging data produced by multiple applications and associated with different organizations typically requires careful coordination, which can result in extended development time, modification time, and resource utilization.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

FIG. 8 depicts a block diagram of a training summary according to some embodiments of the present invention;

FIG. 12 depicts a user interface for reviewing data model output according to some embodiments of the present invention;

DETAILED DESCRIPTION

Figure 1:
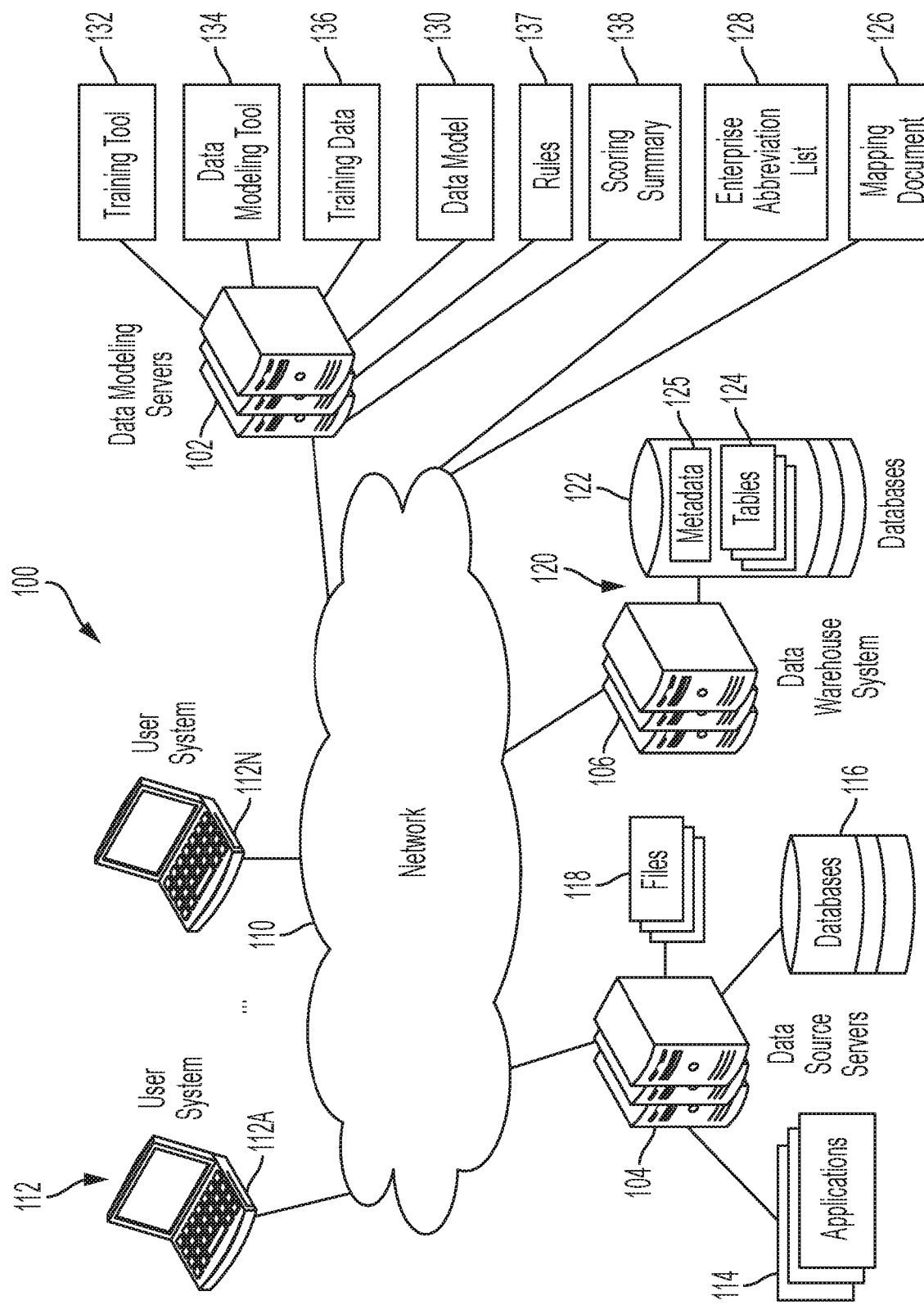
FIG. 1 depicts a block diagram of a system according to some embodiments of the present invention.

According to an embodiment, a system for automated data modeling is provided. The system can improve computer system performance by automating data model generation and updates. Use of machine learning and fuzzy logic can enable automated data model updates that comply with existing rules and constraints that may be inherently embodied within the system but not formally defined or well understood due to complex relationships between many attributes, data structures, and subsystems. The system can scan through databases and identify underlying changes to be modeled. The system can conduct automatic data type conversions across different database technologies and create a data model to deploy. Training of the machine learning can be customized by organization or other subgroupings with multiple sets of metadata tailored to the organization or other subgroupings. Existing enterprise abbreviation lists can be read, and scores can be determined for each word or phrase based on the usage frequency in each organization or other subgroupings. Based on the scoring, the system can combine different words and create acronyms when a physical name reaches a character count limit. The system can also suggest new abbreviations when none exist and apply the new abbreviations to multiple derivatives of the same word. Further, the system can provide feedback to various users who interface with the system.

A typical data modeling process may include business analysts who inspect various data sources, files, and datasets (e.g., mainframe datasets) to produce a mapping document that defines how various types of data are stored and accessed in systems monitored by the analysts. A data modeler may review the mapping document for changes and review enterprise abbreviations to determine a data definition language format to create or modify one or more tables in an enterprise data warehouse, while avoiding conflicting definitions. An enterprise data warehouse may have hundreds of tables that require frequent maintenance, for instance, as various attributes may be added, modified, or removed. A data modeler can identify, analyze, and map changes to create updates to physical and logical data models. Physical data models can refer to data column names in underlying tables that may have naming conventions based on the technology used to implement the data models, while logical data models may be organized according to naming conventions and preferences of an organization. The process of data model creation and data management can lead to excessive resource utilization, for instance, where mappings are inefficiently assigned to physical resources, where excessive data size is allocated, where unneeded data are not removed, where lapses in naming conventions result in duplicate or unneeded definitions, and/or other such inefficiencies. Embodiments can, for example, increase data management efficiency, reduce processing time needed to complete updates, and identify inconsistencies or potential constraint violations before updates are finalized.

Turning now to FIG. 1, a system 100 is depicted upon which automated data modeling may be implemented. The system 100 includes a plurality of subsystems, such as one or more data modeling servers 102, one or more data source servers 104, and a data warehouse system 106 coupled to a network 110. A plurality of user systems 112 can access content and/or interfaces through the network 110. For example, user system 112A may be configured as a modeler system operable to interface with the data modeling servers 102, while user system 112N may be configured as an analyst system operable to interface directly with the data source servers 104 and access other elements of the system 100 indirectly, such as the data warehouse system 106.

The data source servers 104 can execute applications 114 that interface with various data sources, such as databases 116 and files 118. The databases 116 can be configured in various formats depending on the underlying technologies used to manage the databases 116. Further, applications 114 may have different interfaces and use different approaches to access and update data stored in the databases 116. One or more of the files 118 may be accessed, modified, or generated by the applications 114. For example, files 118 can include various documents, spreadsheets, images, and other such data used by the applications 114 and may be linked or otherwise associated with data stored in the databases 116.

The data warehouse system 106 can be part of an enterprise data warehouse 120 that may include multiple databases 122 configured to store tables 124 of data. The enterprise data warehouse 120 can also store metadata 125 defining one or more aspects of data within the databases 122, such as database schemas. Data stored in databases 122 can be in various formats that can differ from the format and content of data stored in databases 116. The databases 122 can collectively comprise an archival store that merges data from the databases 116 and performs format adjustments as needed. In order to support queries and retrieval of data from the enterprise data warehouse 120, a mapping document 126 can define how data from the applications 114, databases 116, and/or files 118 should be stored in a structured form. Examples of formatting can include field names, data types, field sizes, and other such information defined in the mapping document 126. To avoid conflicts in naming and maintain consistency, while also reducing field size requirements, an enterprise abbreviation list 128 can be defined that indicates how known words or phrases should be abbreviated. As the size of the enterprise abbreviation list 128 grows, it can become difficult to form new abbreviations consistently by users, while also avoiding conflicting terms that may result in ambiguity or errant mapping.

Rather than relying on users to manually generate or modify abbreviations associated with the enterprise abbreviation list 128 and manually build a data model 130 that defines the structure of tables 124 and/or other elements of the enterprise data warehouse 120 which are consistent with the mapping document 126, embodiments can use machine learning through a training tool 132 and a data modeling tool 134. The training tool 132 and data modeling tool 134 can execute on one or more of the data modeling servers 102. Training data 136 can be populated using supervised or unsupervised learning. As one example, the training tool 132 can perform a scoring process to generate a scoring summary 138 to produce the training data 136 according to processes further described herein. The training data 136 can be used to develop or refine the data model 130. For instance, the data modeling tool 134 can update the data model 130 with one or more new field names using a new abbreviation determined in part through applying the training data 136. The training tool 132 can learn and apply rules 137 regarding formatting, abbreviations, phrase formation, and other such constraints. Fuzzy reasoning logic can be applied to identify one or more relationship patterns and weights for the phrases including at least one shared word based on the scoring summary 138 to produce a plurality of training data 136 for the data model 130 associated with the enterprise data warehouse 120. The data model 130 can formally describe or update the metadata 125 or other aspects of the enterprise data warehouse 120, such as renaming existing fields or adding new fields consistent with desired mappings captured in the mapping document 126.

In the example of FIG. 1, each of the data modeling servers 102, data source servers 104, data warehouse system 106, and user systems 112 can include a processor (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100, such as elements of the data modeling servers 102, data source servers 104, data warehouse system 106, and/or user systems 112. Although depicted separately, one or more of the data modeling servers 102, data source servers 104, data warehouse system 106, and/or user systems 112 can be combined or further subdivided.

The user systems 112 may each be implemented using a computer executing one or more computer programs for carrying out processes described herein. In one embodiment, the user systems 112 may each comprise a personal computer (e.g., a laptop, desktop, etc.), a network server-attached terminal (e.g., a thin client operating within a network), or a portable device (e.g., a tablet computer, personal digital assistant, smart phone, etc.). In an embodiment, the user systems 112 are operated by users having the role of analysts of organizations that interact with the data source servers 104 and/or data architects that use the data modeling servers 102 to support data format translation and long-term storage of data from the data source servers 104 in the enterprise data warehouse 120.

Each of the data modeling servers 102, data source servers 104, data warehouse system 106, and user systems 112 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

The network 110 can include any type of computer communication technology within the system 100 and can extend beyond the system 100 as depicted. Examples include a wide area network (WAN), a local area network (LAN), a global network (e.g., Internet), a virtual private network (VPN), and an intranet. Communication within the network 110 may be implemented using a wired network, an optical network, a wireless network and/or any kind of physical network implementation known in the art. The network 110 can be further subdivided into multiple sub-networks that may provide different levels of accessibility or prevent access to some elements of the system 100. For example, some of the user systems 112 may not have access to the data modeling servers 102 and/or the data warehouse system 106.

Figure 2:
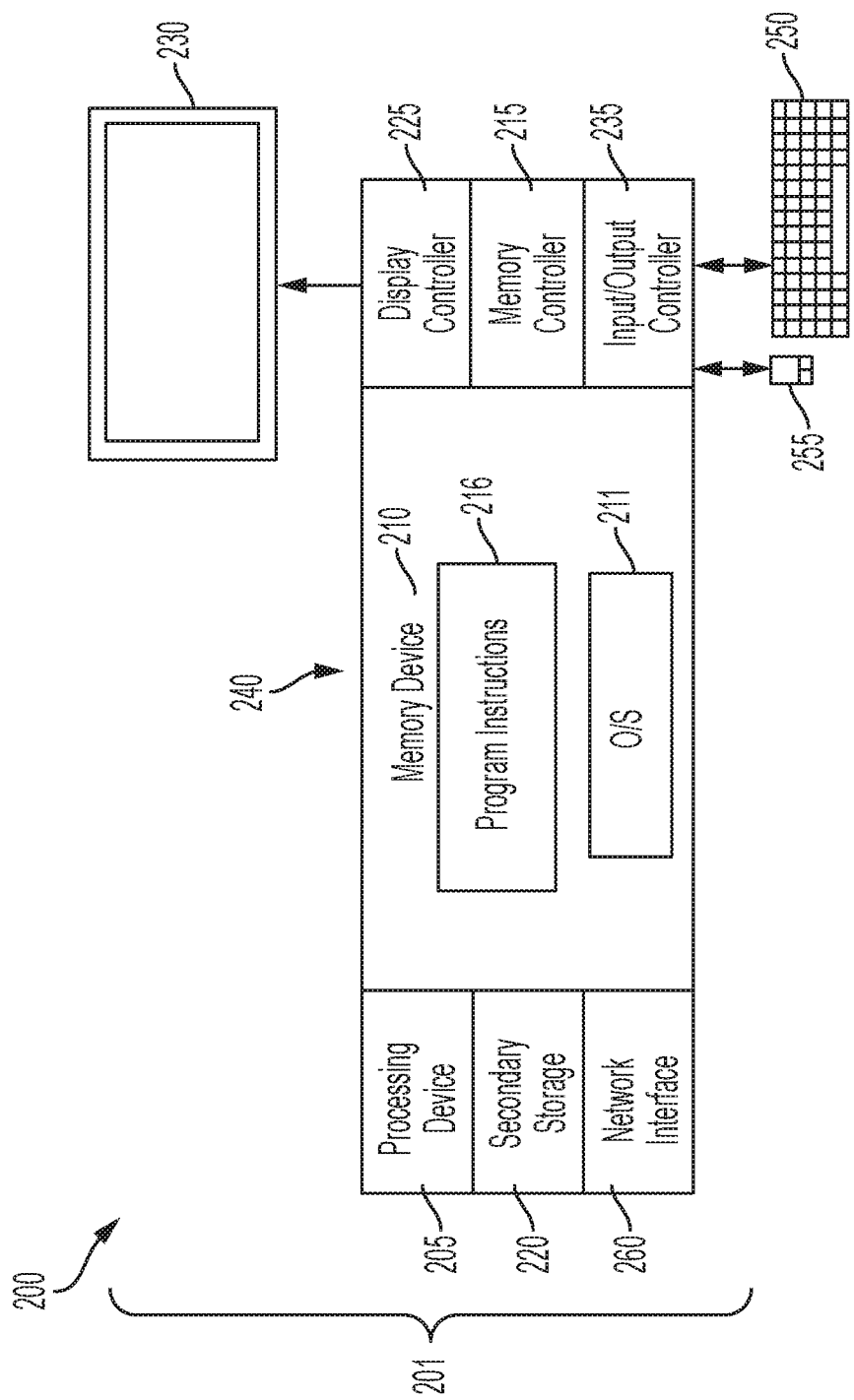
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the data modeling servers 102, data source servers 104, data warehouse system 106, and/or user systems 112 of FIG. 1.

In an exemplary embodiment, in terms of hardware architecture, as shown in FIG. 2, the computer 201 includes a processing device 205 of a processing system and a memory device 210 of a memory system coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), or the like, etc.). Secondary storage 220 can include any one or combination of tape, compact disk read only memory (CD-ROM), flash drive, disk, hard disk drive, diskette, cartridge, cassette or the like, etc. Moreover, the memory device 210 and/or secondary storage 220 may incorporate electronic, magnetic, optical, and/or other types of storage media. Accordingly, the memory device 210 and/or secondary storage 220 are examples of a tangible computer readable storage medium 240 upon which instructions executable by the processing device 205 may be embodied as a computer program product. The memory device 210 and/or secondary storage 220 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (O/S) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the processes as further described herein.

The computer 201 of FIG. 2 also includes a network interface 260 that can establish communication channels with one or more other computer systems via one or more network links of the network 110 of FIG. 1. The network interface 260 can support wired and/or wireless communication protocols known in the art.

Figure 3:
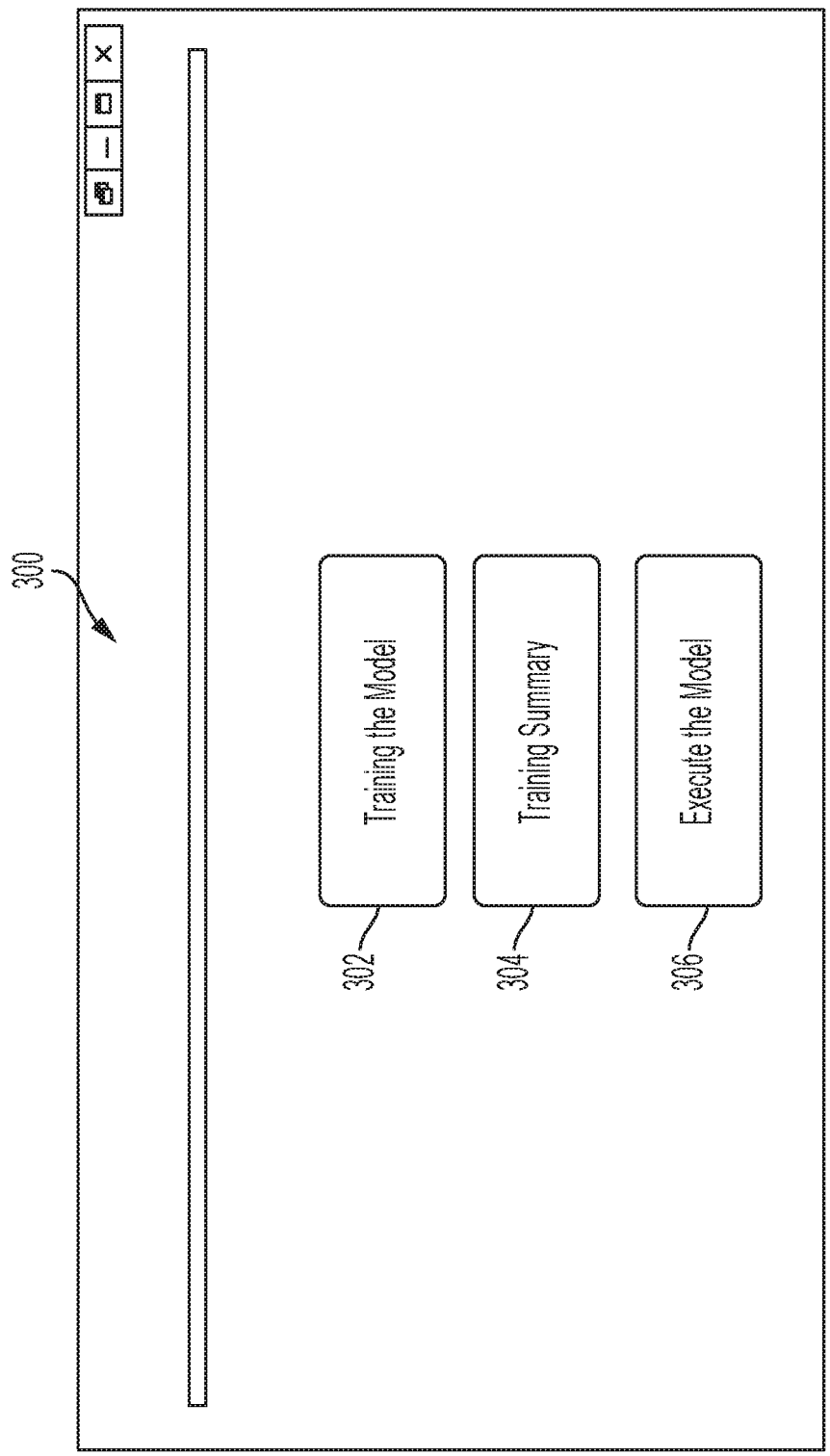
FIG. 3 depicts a user interface for training and data modeling according to some embodiments of the present invention.

FIG. 3 depicts a user interface 300 for a data modeling training tool according to an embodiment. For example, one of the user systems 112 of FIG. 1 can enable access and display of the user interface 300 that may run locally on one of the user systems 112 or remotely on another system, such as one of the data modeling servers 102 of FIG. 1. The user interface 300 can include a selectable input 302 to invoke the training tool 132 of FIG. 1 for training the data model 130. The user interface 300 can also include a selectable input 304 to display a training summary associated with results of training. For example, the selectable input 304 may trigger the training tool 132 to display aspects of the training data 136 and/or scoring summary 138 of FIG. 1. The user interface 300 can also include a selectable option 306 to execute the data model 130 of FIG. 1 after training and adjustments to the data model 130 have been performed. For example, the selectable input 306 may trigger the data modeling tool 134 of FIG. 1 to use the data model 130 to produce one or more updated definitions for the metadata 125 or tables 124 of the enterprise data warehouse 120.

It will be understood that the example of FIG. 3 is for purposes of explanation and many variations to the user interface 300 are contemplated. For example, there can be additional selectable options, status information, instructions, and/or other content displayed as part of user interface 300. Further, the selectable inputs 302-306 can be further subdivided or combined and may be selectable using any format, such as buttons, pull-down selections, scrolling inputs, menus, and other such selectable formats.

Figure 4:
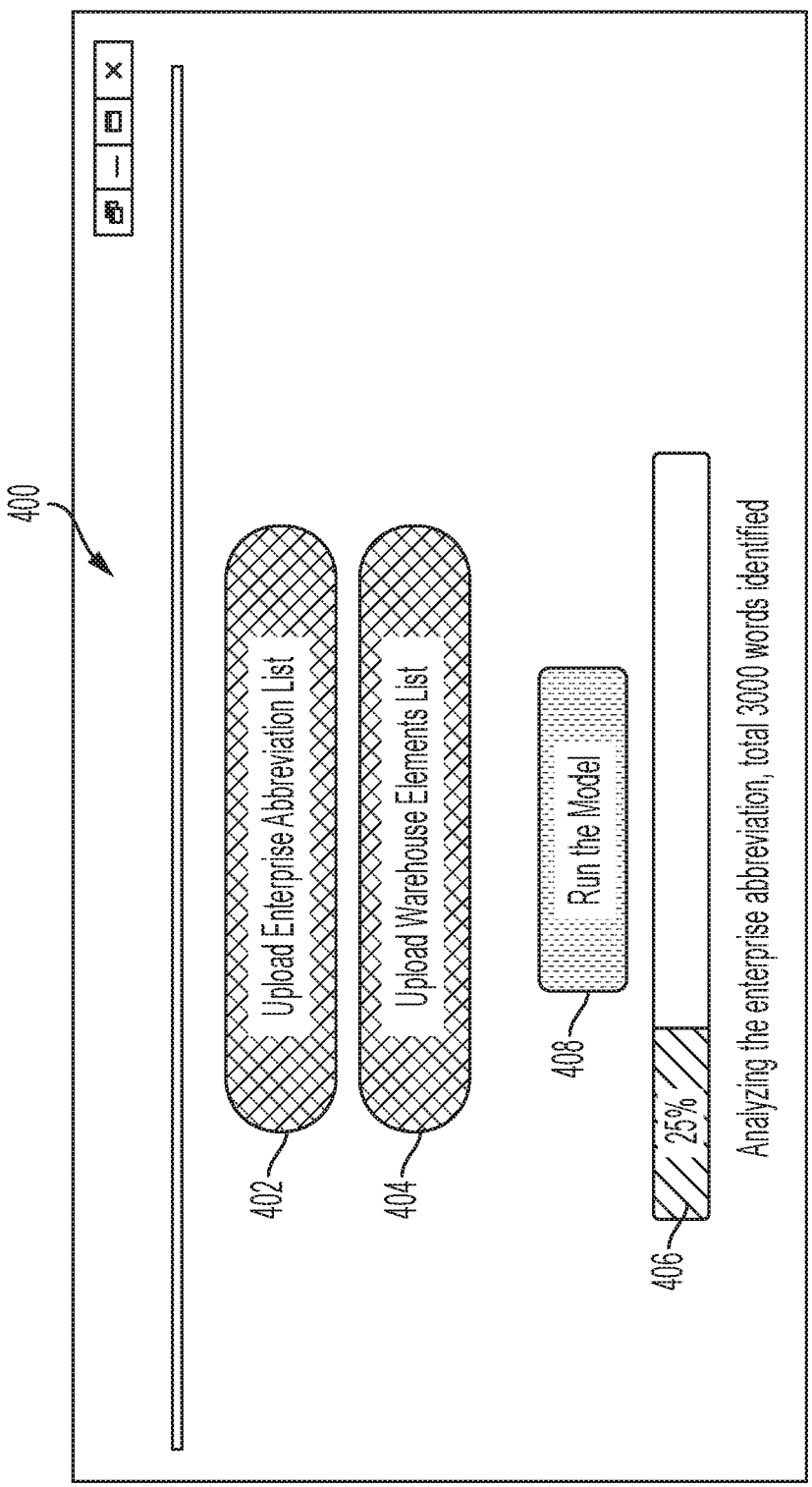
FIG. 4 depicts a user interface for training and data modeling in a first state according to some embodiments of the present invention.

FIG. 4 depicts an example of a user interface 400 for the training tool 132 and the data modeling tool 134 of FIG. 1 in a first state according to an embodiment. The user interface 400 can be displayed, for example, in response to a detected selection of the selectable input 302 of FIG. 3. The user interface 400 can include multiple selectable options 402, 404. Selectable option 402 may trigger uploading of the enterprise abbreviation list 128 of FIG. 1, for instance, to the data modeling servers 102 for use by the training tool 132. Selectable option 404 may trigger uploading of a warehouse elements list that may be part of the metadata 125 of the enterprise data warehouse 120 of FIG. 1 for use by the training tool 132. The warehouse elements list can define names, abbreviations, data types, and other such information for elements already in use within the enterprise data warehouse 120, while the enterprise abbreviation list 128 can include existing approved abbreviations regardless of whether the abbreviations are currently in use. Status information 406 can be displayed on the user interface 400 based on selection of the selectable options 402, 404. For example, in response to selection of the selectable option 402 to upload the enterprise abbreviation list 128, the status information 406 can indicate progress of analysis being performed by the training tool 132. Some selectable options, such as a run the model option 408 may be disabled from selection until uploading and analysis steps are successfully completed.

It will be understood that the example of FIG. 4 is for purposes of explanation and many variations to the user interface 400 are contemplated. For example, there can be additional selectable options, status information, instructions, and/or other content displayed as part of user interface 400. Further, the selectable options 402, 404, 408 can be further subdivided or combined and may be selectable using any format, such as buttons, pull-down selections, scrolling inputs, menus, and other such selectable formats.

Figure 5:
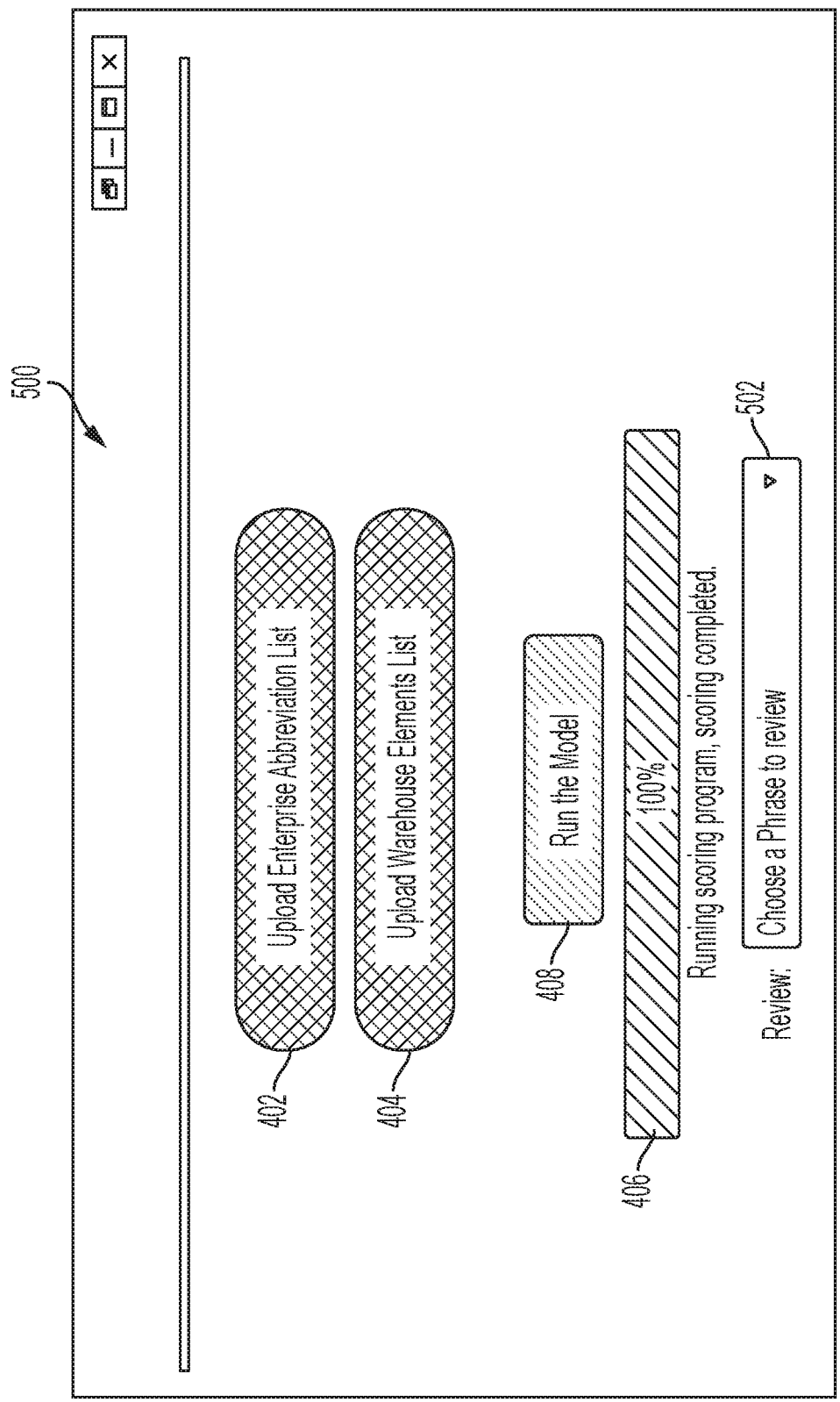
FIG. 5 depicts a user interface for training and data modeling in a second state according to some embodiments of the present invention.

FIG. 5 depicts an example of a user interface 500 for the training tool 132 and the data modeling tool 134 of FIG. 1 in a second state according to an embodiment. Once the upload of the enterprise abbreviation list 128 of FIG. 1 is completed based on selection of the selectable option 402 and the upload of a warehouse elements list is completed based on selection of the selectable option 404, a scoring program can be executed, for instance, as part of the training tool 132. The status information 406 can indicate further status updates, such as completion of the scoring program. Completion of the scoring program may also result in enabling the run the model option 408 and may result in additional selectable options being displayed and/or enabled, such as a review option 502. The scoring program can be part of the training tool 132 or a separate program (not depicted). The scoring program can generate the scoring summary 138 of FIG. 1 and is further described herein.

It will be understood that the example of FIG. 5 is for purposes of explanation and many variations to the user interface 500 are contemplated. For example, there can be additional selectable options, status information, instructions, and/or other content displayed as part of user interface 500. Further, the selectable options 402, 404, 408, 502 can be further subdivided or combined and may be selectable using any format, such as buttons, pull-down selections, scrolling inputs, menus, and other such selectable formats.

Figure 6:
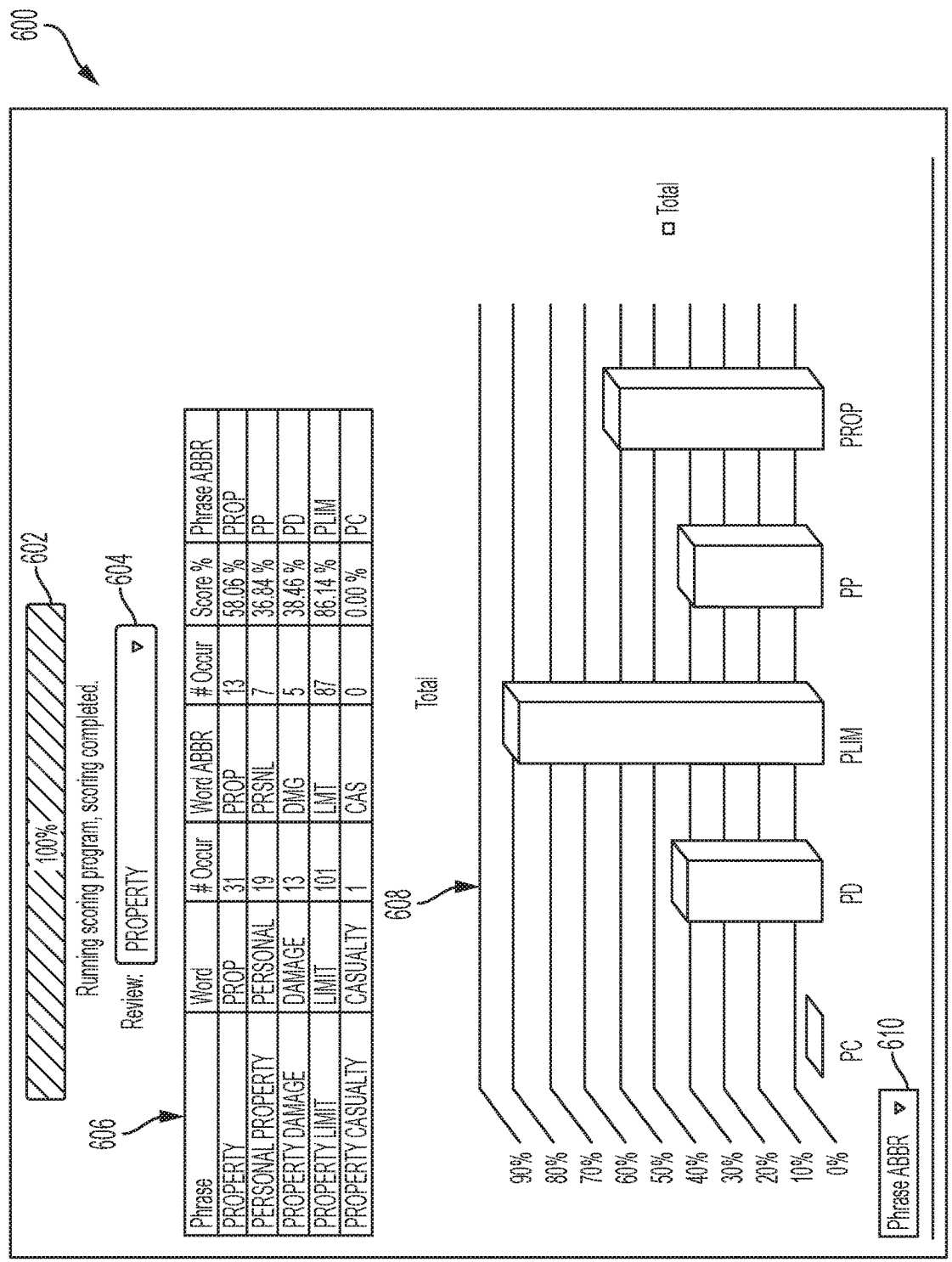
FIG. 6 depicts a scoring summary according to some embodiments of the present invention.

FIG. 6 depicts a scoring summary report 600 associated with the scoring summary 138 of FIG. 1 according to an embodiment. The scoring summary report 600 can include a completion status 602, a review selector 604 that may identify phrases having multiple possible abbreviations. Summary data can be presented in a summary table 606 and/or a summary chart 608. The contents of the summary chart 608 can be selected by a chart type selector 610. In the example of FIG. 6, a phrase of "PROPERTY" is selected for review through the review selector 604 after running the scoring program. The summary table 606 illustrates example phrases identified in the analysis that incorporate "PROPERTY", such as "PROPERTY", "PERSONAL PROPERTY", "PROPERTY DAMAGE", "PROPERTY LIMIT", and "PROPERTY CASUALTY", where each phrase can have an associated word, number of occurrences of the word, associated word abbreviation, number of occurrences of the associated word abbreviation, scoring percentage, and associated phrase abbreviation. In the example of FIG. 6, the chart type selector 610 is set to a phrase abbreviation chart that graphically depicts scoring percentages.

Figure 7:
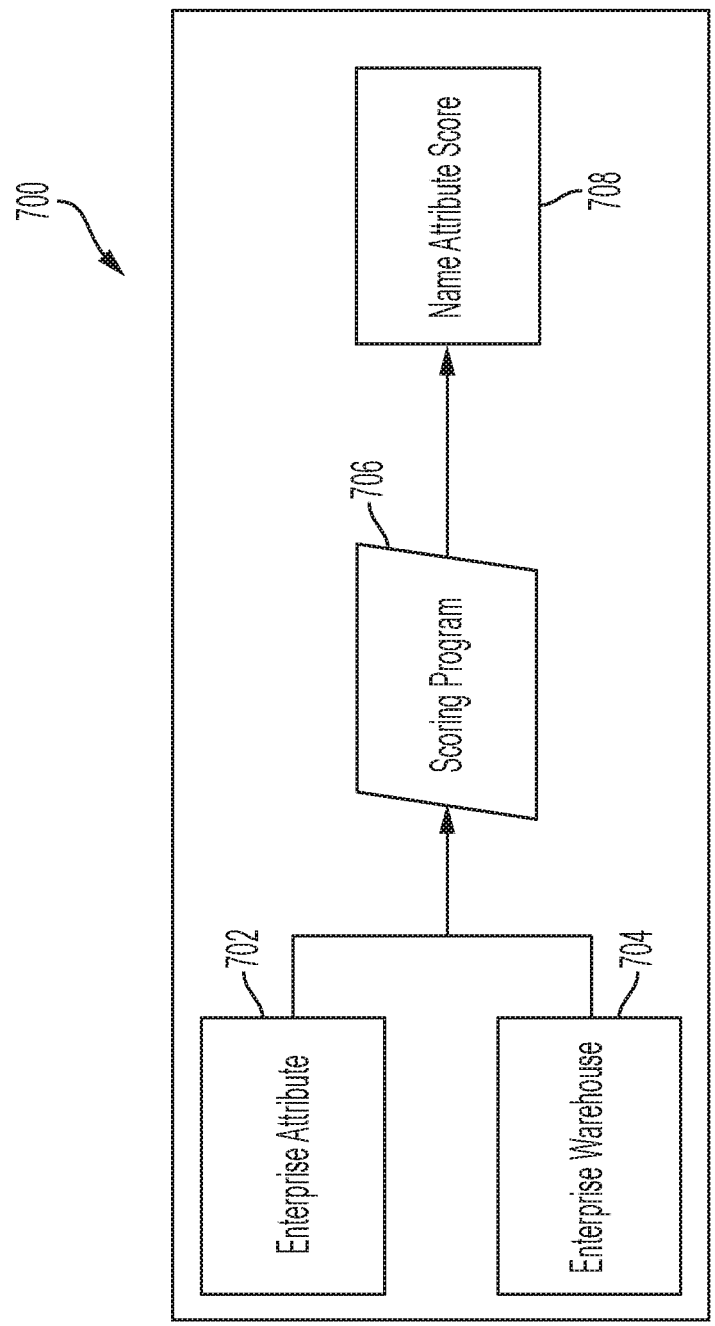
FIG. 7 depicts a block diagram of a scoring process according to some embodiments of the present invention.

The summary table 606 and summary chart 608 can be generated according to a scoring process 700 as depicted in the example of FIG. 7. In the scoring process 700, an enterprise attribute 702 and enterprise warehouse records 704 can be extracted from the enterprise data warehouse 120 of FIG. 1 by a scoring program 706 to determine a name attribute score 708. An enterprise attribute 702 can be a word or phrase indicative of a field or column name. Each word or phrase that makes up all or a portion of an enterprise attribute 702 may be referred to as an enterprise term. The scoring program 706 can be part of the training tool 132 of FIG. 1 or part of a separate executable program. The scoring program 706 can count the number of times that an enterprise term and its corresponding abbreviation is used in the enterprise data warehouse 120 and may assign a percentage score as the name attribute score 708.

In the example of FIG. 6, the word "PROPERTY" occurs 31 times as a logical name in the enterprise data warehouse 120, but a corresponding abbreviation of "PROP" is used only 13 times as a physical column name. The logical name may represent a naming preference specific to an organization that generates or uses the data. The word "PROPERTY" is also observed in combination with other words, such as "DAMAGE" or "PERSONAL", and a shorter abbreviation is used. For instance, the word "DAMAGE" may be observed with an abbreviation of "DMG" and "PERSONAL" abbreviated as "PRSNL" when the words are part of a logical name that has "PROPERTY" in the abbreviation with further shortening. Thus, the phrase "PERSONAL PROPERTY" may be observed with an abbreviation of "PP" instead of "PRSNL_PROP", and "PROPERTY DAMAGE" may be observed with an abbreviation of "PD" instead of "PROP_DMG". The corresponding score can help to determine the weight that the words hold in the enterprise data warehouse 120. The name attribute score can be further used in abbreviation logic when a physical abbreviated column name exceeds a length limit.

It will be understood that the example of FIG. 6 is for purposes of explanation and many variations to the scoring summary report 600 are contemplated. For example, there can be additional selectable options, status information, instructions, tables, charts, and/or other content displayed as part of the scoring summary report 600.

Figure 8:
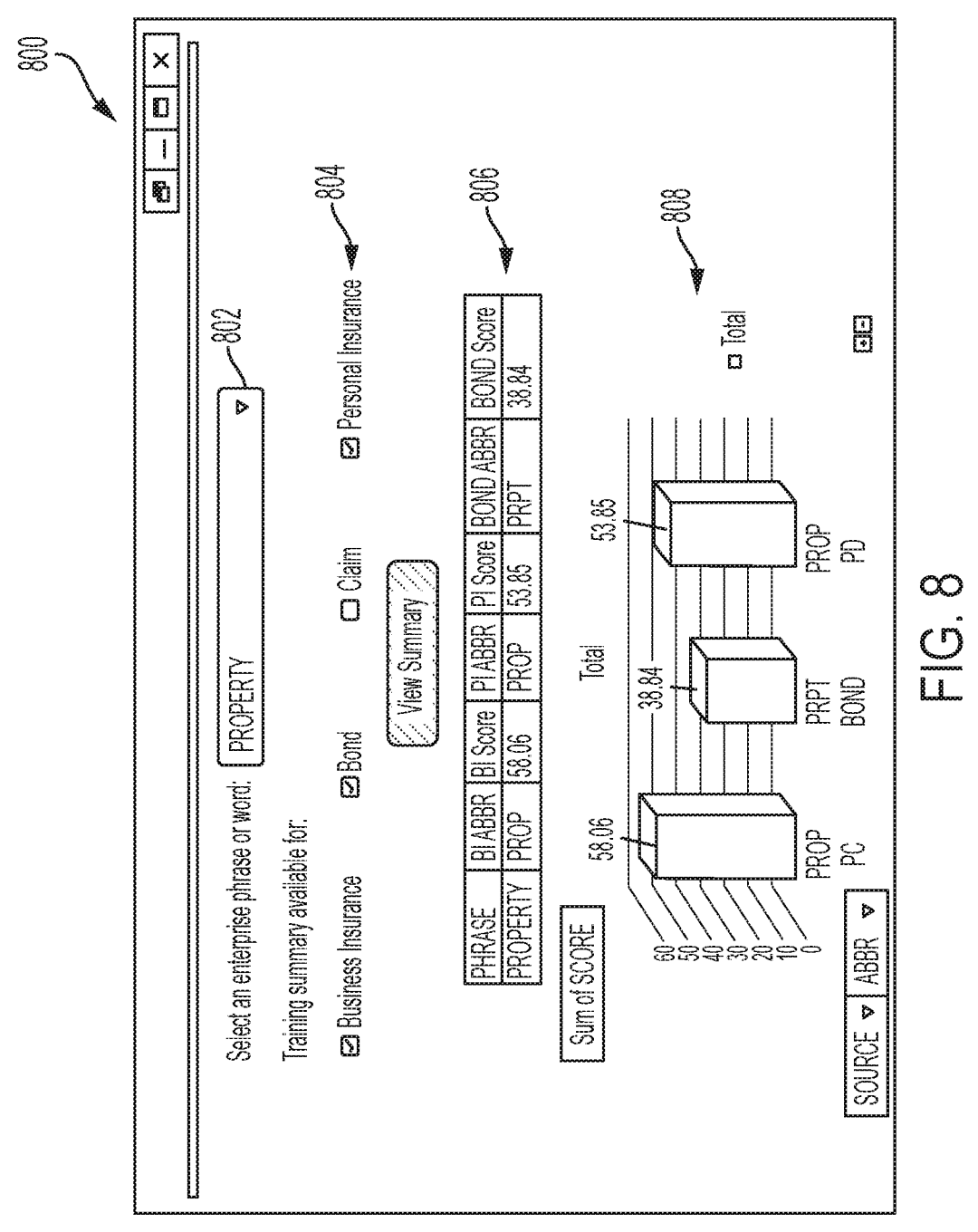

FIG. 8 depicts a block diagram of a training summary 800 according to an embodiment. The training summary 800 can include a word-phrase selector 802, an organization selector 804, a summary table 806, and an associated chart 808. For a selected word or phrase having scoring performed by the scoring process 700 of FIG. 7, the word-phrase selector 802 can select a word or phrase that has been analyzed by the scoring process 700. The organization selector 804 can further filter the results according to how the word or phrase is scored by an organization or business unit. For example, the phrase "PROPERTY" may be primarily abbreviated as "PROP" based on examining data from the enterprise data warehouse 120 for two organizations but abbreviated as "PRPT" by a third organization, where all three organizations share the enterprise data warehouse 120. The training summary 800 may be reached, for example, based on a selection of the selectable input 304 of the user interface 300 of FIG. 3. The training summary 800 can enable a user to compare scoring summaries across various databases 122 of the enterprise data warehouse 120.

It will be understood that the example of FIG. 8 is for purposes of explanation and many variations to the training summary 800 are contemplated. For example, there can be additional selectable options, status information, instructions, tables, charts, and/or other content displayed as part of the training summary 800.

Figure 9:
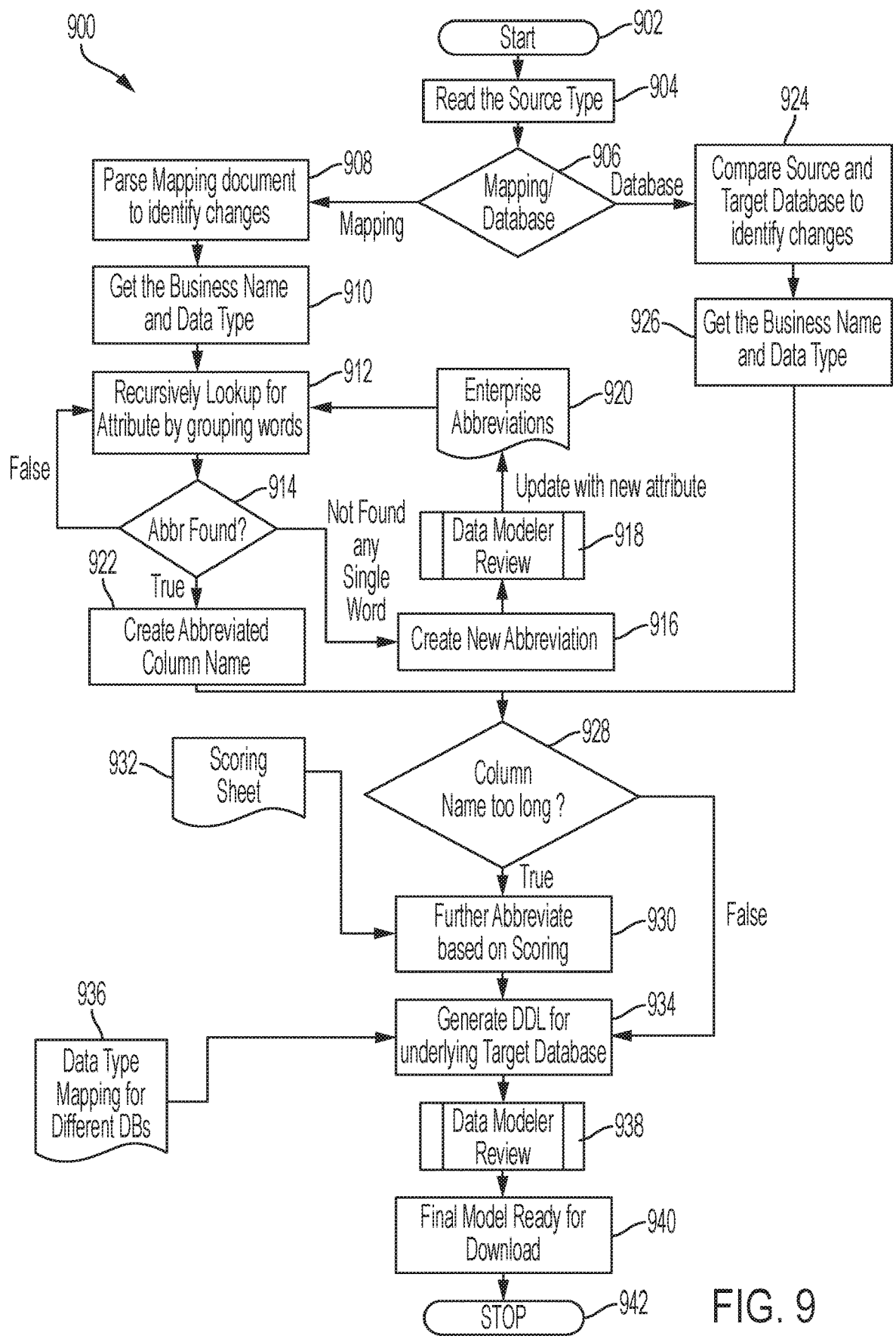
FIG. 9 depicts a process flow of updating a data model according to some embodiments of the present invention.

FIG. 9 depicts a process flow 900 of updating a data model, such as data model 130 of FIG. 1, according to some embodiments. The process flow 900 may be executed, for example, based on selection of the selectable input 306 of the user interface 300 of FIG. 3 or selection of the run the model option 408 of FIG. 5. The process flow 900 can be executed as part of the data modeling tool 134 of FIG. 1 or other such tool. In the example of FIG. 9, the process flow 900 starts at block 902 and advances to block 904. At block 904, a source type can be read, where the source type indicates whether a mapping document, such as the mapping document 126 should be parsed to search for changes or if the databases 116, 122 of FIG. 1 should be analyzed to identify changes. The selection between source types can be performed through user interfaces 1000 and 1100 of FIGS. 10 and 11 for mapping-document based model generation and user interface 1400 of FIG. 14 for database-based model generation. At block 906 of process flow 900, if the source type is selected as the mapping document 126, then the process flow 900 proceeds to block 908.

At block 908, the mapping document 126 can be parsed to identify any changes. Updates may be marked within the mapping document 126, identified through a change history of the mapping document 126, or determined based on a comparison with a previous version of the mapping document 126, for example. At block 910, a logical name (also referred to as a business name or an organization identifier) and data type of an attribute can be retrieved based on one or more changes identified in the mapping document 126. For example, data types may be integers, decimals, character strings, date/time, and other such types, including field size constraints. At block 912, a recursive lookup operation can be performed for attributes by grouping words. Attributes can refer to a preferred description or field name associated with an organization. Attributes can be individual words or multiple words grouped in phrases, such as "PROPERTY", "PERSONAL PROPERTY", "PROPERTY DAMAGE", "PROPERTY LIMIT", "PROPERTY CASUALTY", and so forth. The lookup may access enterprise abbreviations 920 from the enterprise abbreviation list 128 of FIG. 1. At block 914, if an abbreviation is not found for any single word, then at block 916 a new abbreviation is created. The new abbreviation may be displayed on a user interface or report for data model reviewer confirmation at block 918. An abbreviation associated with a new attribute can be added to enterprise abbreviations 920 of the enterprise abbreviation list 128, and the process flow 900 can continue at block 912. If an abbreviation is not found at block 914 but groupings are still available to recursively search, then the process flow 900 can continue with recursive searching at block 912. If an abbreviation is found at block 914, then an abbreviated column name can be created at block 922.

At block 906, if a source type is selected as a database, then at block 924, a schema comparison of a source database and a target database can be performed to identify changes as further described herein. At block 926, an organization identifier and data type can be retrieved based on one or more changes identified in the comparison of block 924. It may be presumed that a new abbreviated column name identified from the database comparison is an adequate initial abbreviation until further refinements are considered in subsequent blocks.

At block 928, after blocks 922 or 926 result in an abbreviation for a column name, a length check can be performed to determine whether the column name is too long. For example, acceptable column names at an organization level or possible column names may violate size constraints of the enterprise data warehouse 120 of FIG. 1. At block 930, further abbreviation options can be considered based on a scoring sheet 932 of associated words from the scoring summary 138 of FIG. 1. Word or phrase options from the scoring sheet 932 can be analyzed with respect to highest scoring results that satisfy column naming length constraints. At block 934, after performing block 930 or determining at block 928 that the column name length was acceptable, a data definition language (DDL) output can be generated for a targeted database, such as one of the databases 122 of the enterprise data warehouse 120. Generation of DDL output can be in the form of a DDL file or other object based on data type mapping 936 associated with the type of databases 122 being updated. Output can be presented through a user interface to a data model reviewer 938 for selection, confirmation, or further adjustment. At block 940, a final model is ready and verified as the data model 130 of FIG. 1, where the data model 130 can be used to update metadata 125 and/or tables 124 of the enterprise data warehouse 120. The process flow 900 terminates at block 942.

The process flow 900 of FIG. 9 is not intended to indicate that the operations of the process flow 900 are to be executed in any particular order, or that all of the operations of the process flow 900 are to be included in every case. Additionally, the process flow 900 can include any suitable number of additional operations.

Figure 10:
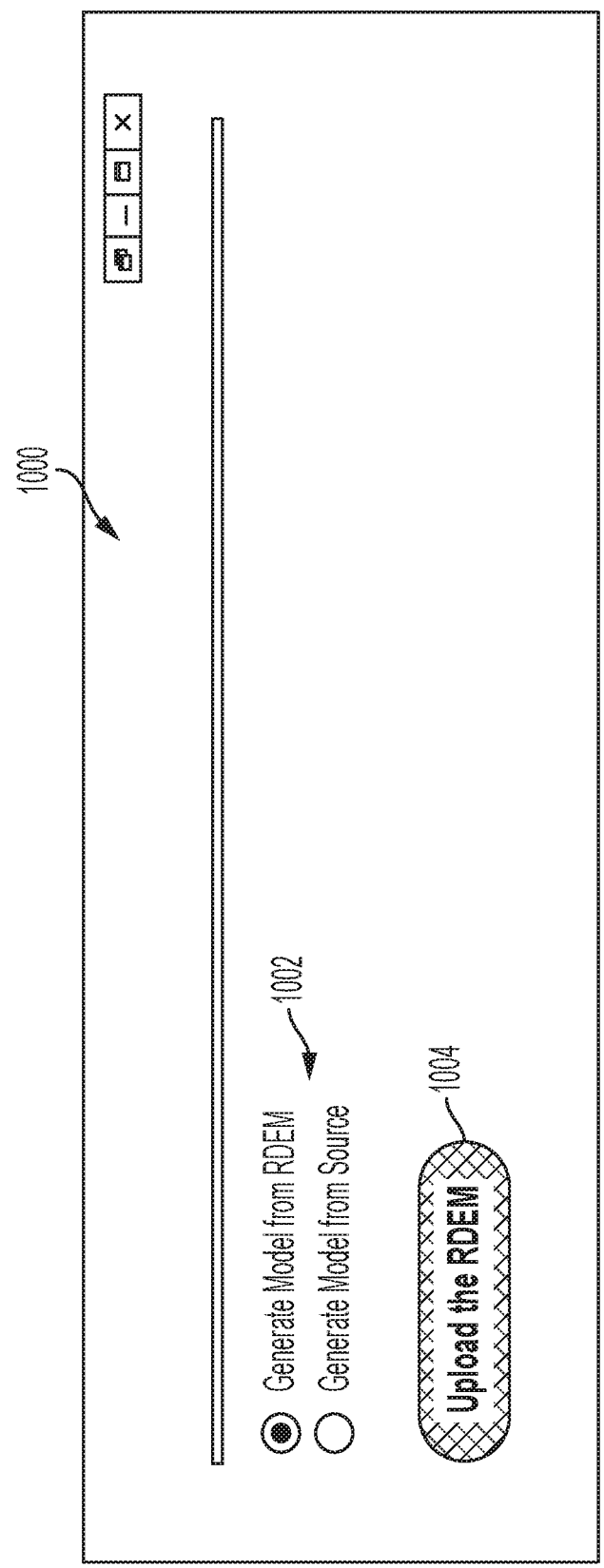
FIG. 10 depicts a user interface for generation of a data model in a first state according to some embodiments of the present invention.

FIG. 10 depicts user interface 1000 for generation of the data model 130 of FIG. 1 in a first state according to an embodiment. User interface 1000 indicates a simplified example for purposes of explanation, where a selectable option 1002 is available for data model generation based on the mapping document 126 of FIG. 1 (also referred to as a required data element map (RDEM)). The selectable option 1002 can alternatively allow for model generation from a source database, such as one of the databases 116 of FIG. 1. Based on selection of the mapping-document based data model generation at selectable option 1002, a selectable input 1004 can be displayed which initiates uploading of the mapping document 126 upon selection.

It will be understood that the example of FIG. 10 is for purposes of explanation and many variations to the user interface 1000 are contemplated. For example, there can be additional selectable options, status information, instructions, and/or other content displayed as part of user interface 1000. Further, the selectable options and inputs 1002, 1004 can be further subdivided or combined and may be selectable using any format, such as buttons, pull-down selections, scrolling inputs, menus, and other such selectable formats.

Figure 11:
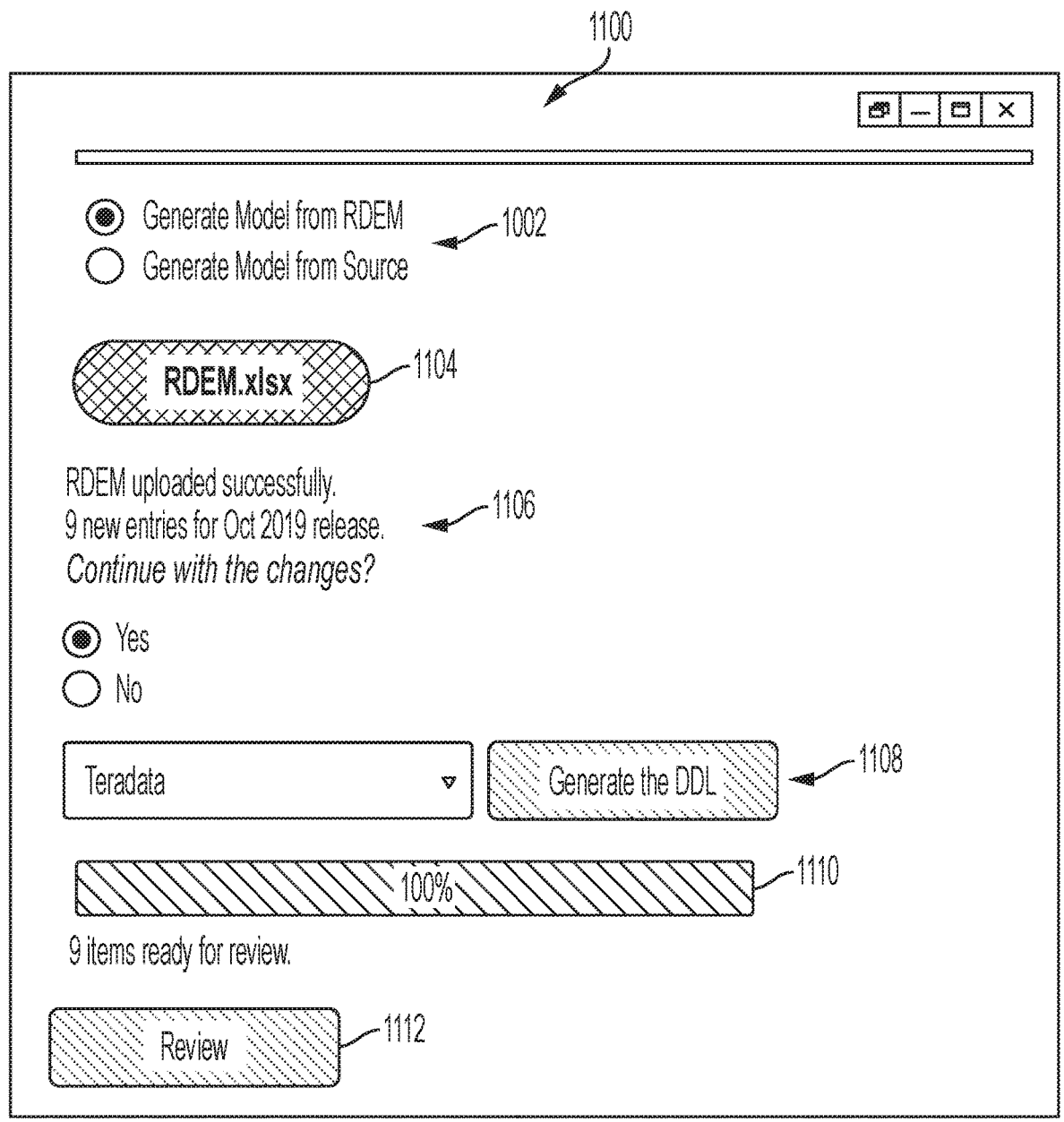
FIG. 11 depicts a user interface for generation of a data model in a second state according to some embodiments of the present invention.

FIG. 11 depicts a user interface 1100 for generation of the data model 130 of FIG. 1 in a second state according to an embodiment. For example, the user interface 1100 may illustrate how the user interface 1000 of FIG. 10 appears after the selectable option 1002 for data model generation is selected and a source file 1104 of the mapping document 126 of FIG. 1 is identified and uploaded. The user interface 1100 can also include a confirmation request 1106, an output format selector 1108, a progress indicator 1110, and a review request selector 1112. The confirmation request 1106 can provide a summary of the identified changes in the mapping document 126 along with release information to confirm that the uploaded version of the mapping document 126 is desired. The output format selector 1108 can allow for selection of various database formats supported by the databases 122 of FIG. 1 and trigger creation of a data definition language file for the data model 130 that corresponds with the selected database format and identified changes in the mapping document 126. The review request selector 1112 can display a data definition language file for the data model 130 for review before committing the changes to the enterprise data warehouse 120 of FIG. 1.

It will be understood that the example of FIG. 11 is for purposes of explanation and many variations to the user interface 1100 are contemplated. For example, there can be additional selectable options, status information, instructions, and/or other content displayed as part of user interface 1100. Further, the selectable options, inputs, and status can be further subdivided or combined and may be selectable using any format, such as buttons, pull-down selections, scrolling inputs, menus, and other such selectable formats.

FIG. 12 depicts a user interface 1200 for reviewing data model output according to an embodiment. The example of FIG. 12 can be the result of selecting the review request selector 1112 of FIG. 11. The user interface 1200 may include a summary table 1202 of logical names identified as new or changed, associated data types, and physical names to be used for corresponding column names in the databases 122 of the enterprise data warehouse 120 of FIG. 1. As can be seen in the example of summary table 1202, logical names used by organizations can be long and descriptive, such as "PROPERTY DAMAGE OCCURRENCE PROTECTION AND INDEMNITY DEDUCTIBLE AMOUNT" which can be reduced down to "PROP_DMG_OCCR_PI_DED_AMT" as a physical name for a column in the enterprise data warehouse 120 based on machine learning optimizations. The user interface 1200 can also include review questions 1204 that can be used to distinguish between options and various preferences. A submission selector 1206 can indicate that selections in the review questions 1204 are ready for submission. The results of responses to review questions 1204 can be used to train the data model 130 of FIG. 1. The review questions 1204 may provide specific abbreviation options for one or more words. The review questions 1204 may also provide a choice as to the scope of a decision, such as whether the selection should only apply for a particular selection or be applied as a change for future occurrences of the words, for instance, as an update to the enterprise abbreviation list 128.

In embodiments, the mapping document 126 of FIG. 1 can define a source to target mapping, which may include logical names, description, and data types for both sources and targets. This information can be used to identify changes and key input details. The mapping document 126 can be parsed with logical names and data types of the columns getting changed/added being picked up along with target table names. In cases where a logical name is not available, the data modeling tool 134 of FIG. 1 can use natural language processing to retrieve key words from a corresponding description to create a logical name. For example, if the description is, "This field is used to store total premium amount calculated for the period the policy was active", the data modeling tool 134 can create a logical name using key words as "TOTAL PREMIUM AMOUNT PERIOD POLICY ACTIVE".

Once the logical names are identified, the data modeling tool 134 can use the enterprise abbreviation list 128 of FIG. 1 to look for corresponding abbreviations. Resulting words can be grouped together to perform a lookup operation. An example is depicted in table 1.

TABLE 1

Abbreviation Example

| Words to Abbreviate | Enterprise Abbreviation | Acronym Indicator | System1 | System2 | System3 |
|---|---|---|---|---|---|
| ACCOUNT | ACCT | | | ACNT | |
| ACCOUNTING FIELD AUDIT BILLING SYSTEM | AFBS | X | | | |
| ACT | ACT | | | | |
| ACTED | ACT | | | | |
| ACTION | ACT | | | | |
| ACTIVE | ACTV | | ACT | | |
| ACTIVITY | ACTV | | | | ACTY |
| WRITTEN PREMIUM | WPRM | | | | |

In reference to table 1, a logical name of "ACCOUNT WRITTEN PREMIUM AMOUNT" can be looked up as various permutations, such as: "ACCOUNT WRITTEN PREMIUM AMOUNT", "ACCOUNT WRITTEN PREMIUM", "ACCOUNT WRITTEN", "WRITTEN PREMIUM AMOUNT", "WRITTEN PREMIUM", and "PREMIUM AMOUNT". The result of the lookup in this example is that "PREMIUM AMOUNT" is located with an enterprise abbreviation of "WPRM".

Individual words can be looked up to get corresponding abbreviations. If an abbreviation is not found, then a new abbreviation can be created using one or more of the following options: a.) take first few characters; b.) remove vowels; c.) remove vowels and then repeating words; d.) take first few characters of option c output. These options can be defined and updated as part of the rules 137 of FIG. 1. Thus, a logical attribute having the word "CUSTODIAN" can be abbreviated as "CUS", "CUST", "CSTDN", "CST", "CSTD". A preferred version of the abbreviation can be selected, or an alternate abbreviation can be created if the results of the options are not preferred. The data modeling tool 134 can observe the selected preferences and which formatting rules resulted in the selected preferences and score the preferences over time to improve abbreviation recommendations as part of the machine learning process. Once abbreviations have been determined, if a new abbreviated column name exceeds a maximum character length, the data modeling tool 134 can use scoring from the scoring summary 138 to further shorten the abbreviation based on training results. For example, "PROPERTY DAMAGE PROTECTION AND INDEMNITY OCCURRENCE LEGAL LIABILITY DEDUCTIBLE AMOUNT" may be initially abbreviated as "PROP_DMG_PRTC_AND_IND-M_OCCR_LGL_LIAB_DED_AMT", which may still be too long. The data modeling tool 134 can use the score of each word to check how many times full abbreviations of each word appears in an underlying database, such as one of the databases 122 of FIG. 1. Neighboring lower score words can be combined to create an acronym. If a lower scoring word, such as "PROPERTY" is between two higher scoring words or does not have a lower score neighbor, then the corresponding abbreviation may remain unchanged. An example of this scoring is provided in table 2.

TABLE 2

Scoring Example

| Name | Abbrv | Score |
|---|---|---|
| PROPERTY | PROP | 0.28 |
| DAMAGE | DMG | 0.6 |
| PROTECTION | PRTC | 0.3 |
| AND | AND | 0.25 |
| INDEMNITY | INDM | 0.18 |
| OCCURRENCE | OCCR | 0.65 |
| LEGAL | LGL | 0.39 |
| LIABILITY | LIAB | 0.45 |
| DEDUCTIBLE | DED | 0.8 |
| AMOUNT | AMT | 0.9 |

Thus, a shortened abbreviation may become, "PROP_DMG_PI_OCCR_LL_DED_AMT", where "PI" and "LL" are further abbreviated as combinations of words. Score comparisons can be relative rather than using predetermined thresholds as part of the fuzzy reasoning logic which may be defined in the rules 137 of FIG. 1. Patterns and weights of relationships between words and phrases can be refined over time as more data are processed to further refine more complex combinations of words into abbreviations. Once the abbreviation is selected, data types can be applied based on underlying database standards. For instance, a number data type defined in the mapping document 126 may become a smallint data type or a decimal data type based on size and defined standards supported by a target database of the databases 122.

As further selections are made through the review questions 1204, further supporting data can be presented to provide additional detail to assist in making selections before a final submission is performed. An example of such additional detail is provided in FIG. 13.

It will be understood that the example of FIG. 12 is for purposes of explanation and many variations to the user interface 1200 are contemplated. For example, there can be additional selectable options, status information, instructions, and/or other content displayed as part of user interface 1200. Further, the selectable options, inputs, and status can be further subdivided or combined and may be selectable using any format, such as buttons, pull-down selections, scrolling inputs, menus, and other such selectable formats.

Figure 13:
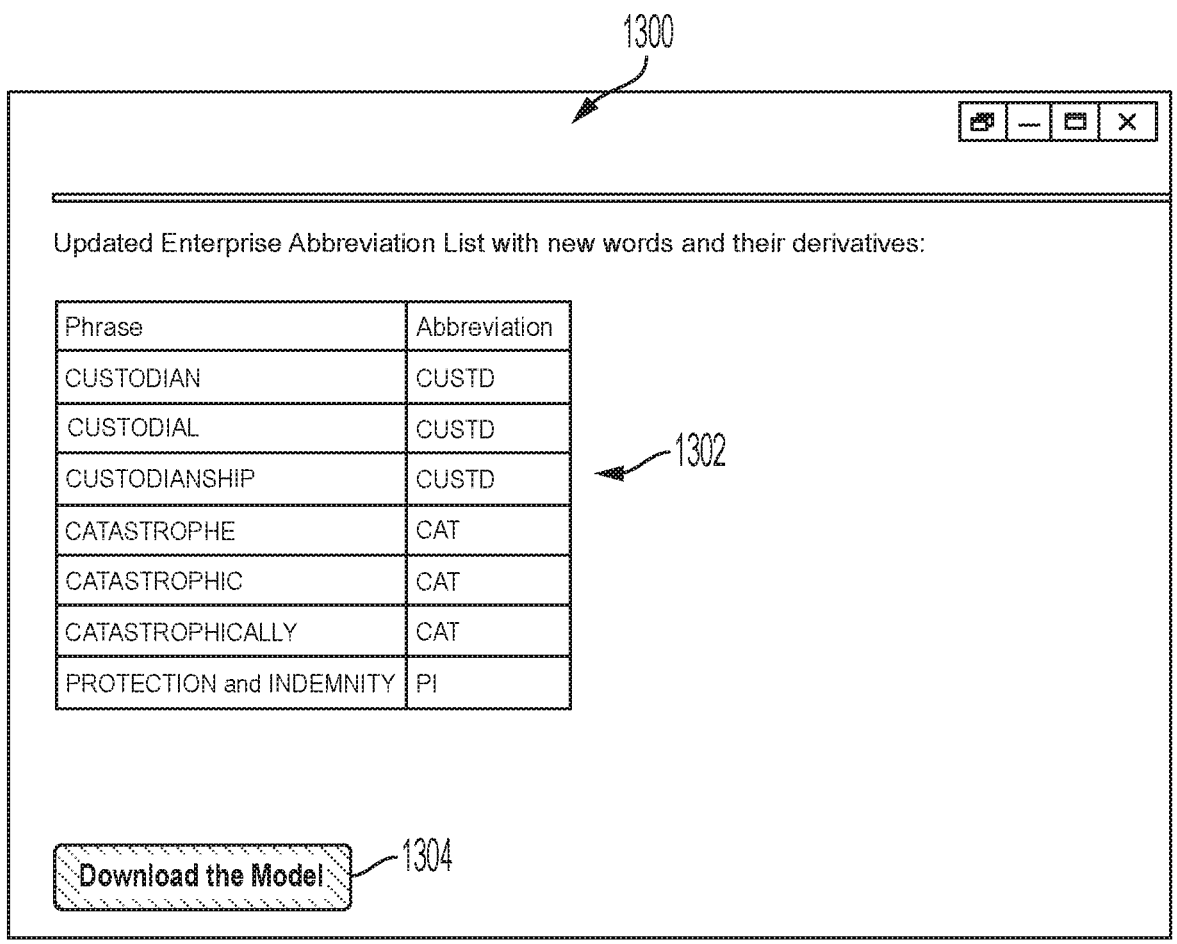
FIG. 13 depicts a user interface of an updated abbreviation list according to some embodiments of the present invention.

FIG. 13 depicts a user interface 1300 of an updated abbreviation list 1302 according to an embodiment. The updated abbreviation list 1302 can include new words and derivatives along with abbreviations as updated in the enterprise abbreviation list 128 of FIG. 1 as a result of executing the data modeling tool 134 of FIG. 1. Derivatives can include words or phrases that have a similar root structure or spelling. For instance, "CUSTODIAN", "CUSTODIAL", and "CUSTODIANSHIP" may all be abbreviated as "CUSTD". Similarly, "CATASTROPHE", "CATASTROPHIC", and "CATASTROPHICALLY" may all be considered derivatives abbreviated as "CAT". The user interface 1300 can also include a selectable option 1304 to download the data model 130 of FIG. 1 that has been updated.

It will be understood that the example of FIG. 13 is for purposes of explanation and many variations to the user interface 1300 are contemplated. For example, there can be additional selectable options, status information, instructions, and/or other content displayed as part of user interface 1300. Further, the selectable options and inputs can be further subdivided or combined and may be selectable using any format, such as buttons, pull-down selections, scrolling inputs, menus, and other such selectable formats.

Figure 14:
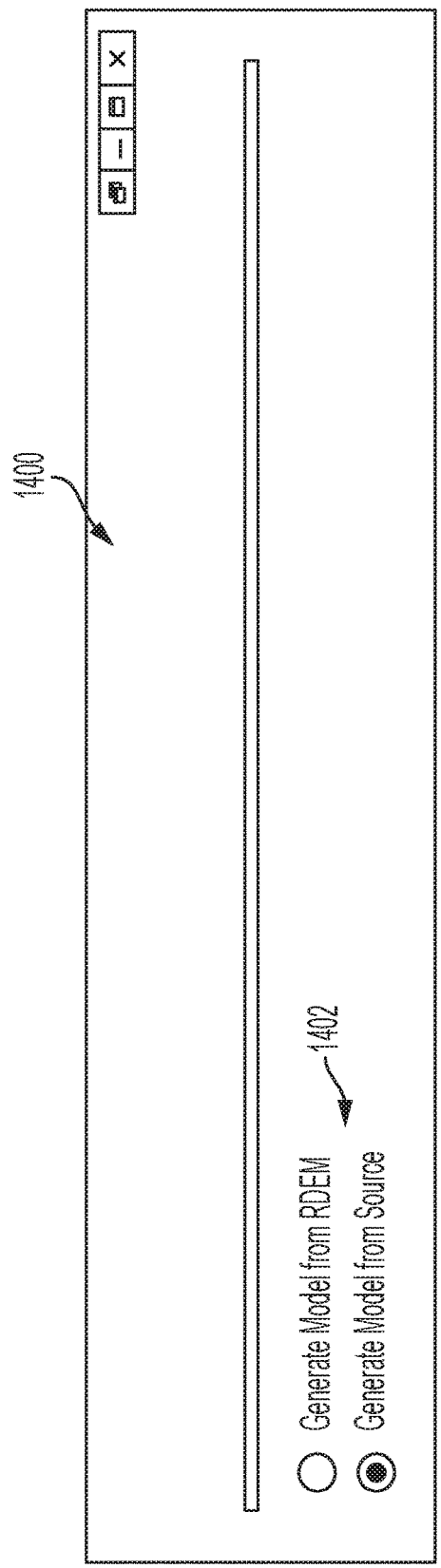
FIG. 14 depicts a user interface for generation of a data model in a third state according to some embodiments of the present invention.

FIG. 14 depicts a user interface 1400 for generation of the data model 130 of FIG. 1 in a third state according to an embodiment. User interface 1400 indicates a selection 1402 of generating the data model 130 based on a source database, such as one of the databases 116 of FIG. 1. Based on selecting a source database as the selection 1402, a database selection interface can be opened as depicted in the example of FIG. 15.

It will be understood that the example of FIG. 14 is for purposes of explanation and many variations to the user interface 1400 are contemplated. For example, there can be additional selectable options, status information, instructions, and/or other content displayed as part of user interface 1400. Further, the selectable options and inputs can be further subdivided or combined and may be selectable using any format, such as buttons, pull-down selections, scrolling inputs, menus, and other such selectable formats.

Figure 15:
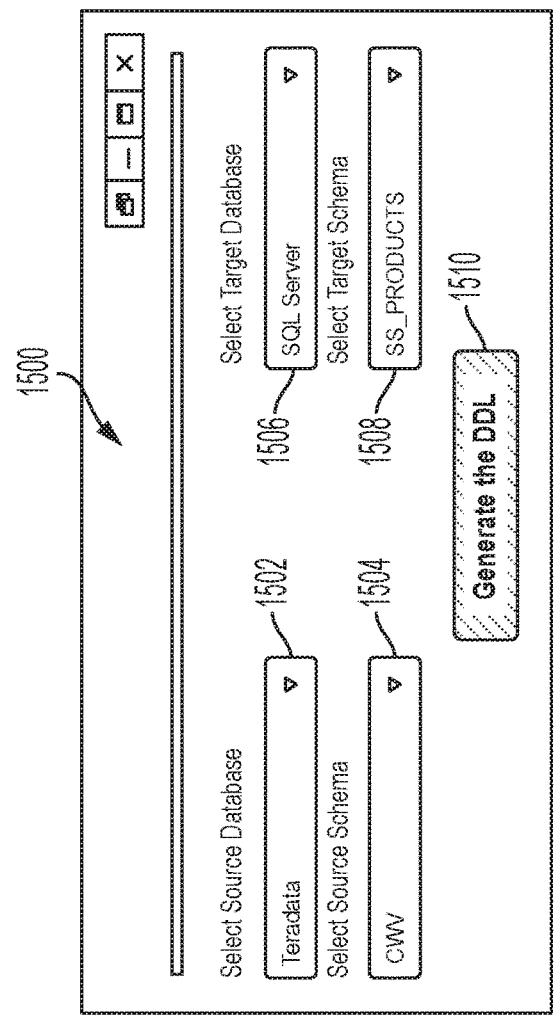
FIG. 15 depicts a user interface for creating a data definition language output based on a selected source according to some embodiments of the present invention.

FIG. 15 depicts a user interface 1500 for creating a data definition language output based on a selected source according to an embodiment. Selection options for a source database can include identification of a source database technology type 1502 and a source schema 1504 for a source database to be analyzed, such as one of the databases 116 of FIG. 1. The user interface 1500 can also allow for selection of a target database technology type 1506 and a target schema 1508 for a target database, such as one of the databases 122 of FIG. 1. A generation selector 1510 can trigger creation of an associated data definition language file that maps column names and data types of the source database through the data model 130 into a format compatible with the target database of the enterprise data warehouse 120 of FIG. 1.

It will be understood that the example of FIG. 15 is for purposes of explanation and many variations to the user interface 1500 are contemplated. For example, there can be additional selectable options, status information, instructions, and/or other content displayed as part of user interface 1500. Further, the selectable options and inputs can be further subdivided or combined and may be selectable using any format, such as buttons, pull-down selections, scrolling inputs, menus, and other such selectable formats.

Figure 16:
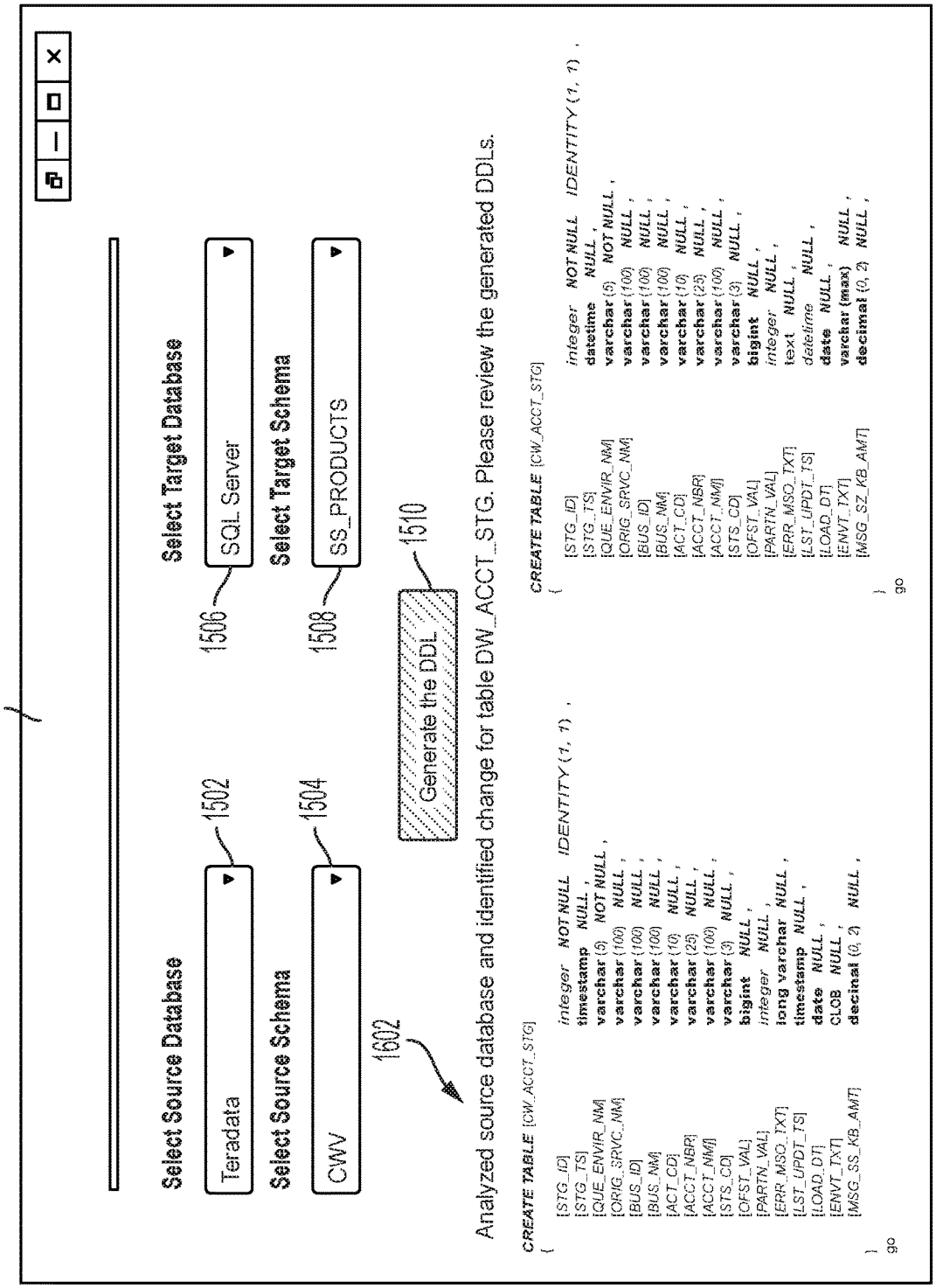
FIG. 16 depicts a user interface with a data definition language output based on a selected source according to some embodiments of the present invention.

FIG. 16 depicts a user interface 1600 with a data definition language output based on a selected source according to an embodiment. User interface 1600 expands upon the user interface 1500 of FIG. 15 to display a preview of a data definition language output 1602 associated with a source database having a source database technology type 1502 and a source schema 1504. The data definition language output 1602 can also display a corresponding definition for the target database based on a target database technology type 1506 and a target schema 1508 after selection of the generation selector 1510. The preview of data definition language output 1602 can enable a user to confirm whether the mapping of column names and data types appear as intended. The data definition language output 1602 can be stored in a file or other object in a command format that aligns with the underlying technologies and schemas to update or interpret data within databases 116, 122 of FIG. 1.

FIG. 16 also illustrates how data types can be automatically remapped between the source schema 1504 and the target schema 1508 based on rules associated with the source database technology type 1502 and the target database technology type 1506. For example, a data type of "timestamp" used by the source database technology type 1502 can be converted into a data type of "datetime" to align with the target database technology type 1506. Similarly, a data type of "long varchar" can be converted to a data type of "text". Further, a data type of character large object ("CLOB") can be converted to a data type of "varchar (max)". Other such data type conversions can be supported through data conversion rules.

It will be understood that the example of FIG. 16 is for purposes of explanation and many variations to the user interface 1600 are contemplated. For example, there can be additional selectable options, status information, instructions, and/or other content displayed as part of user interface 1600. Further, the selectable options and inputs can be further subdivided or combined and may be selectable using any format, such as buttons, pull-down selections, scrolling inputs, menus, and other such selectable formats.

Figure 17:
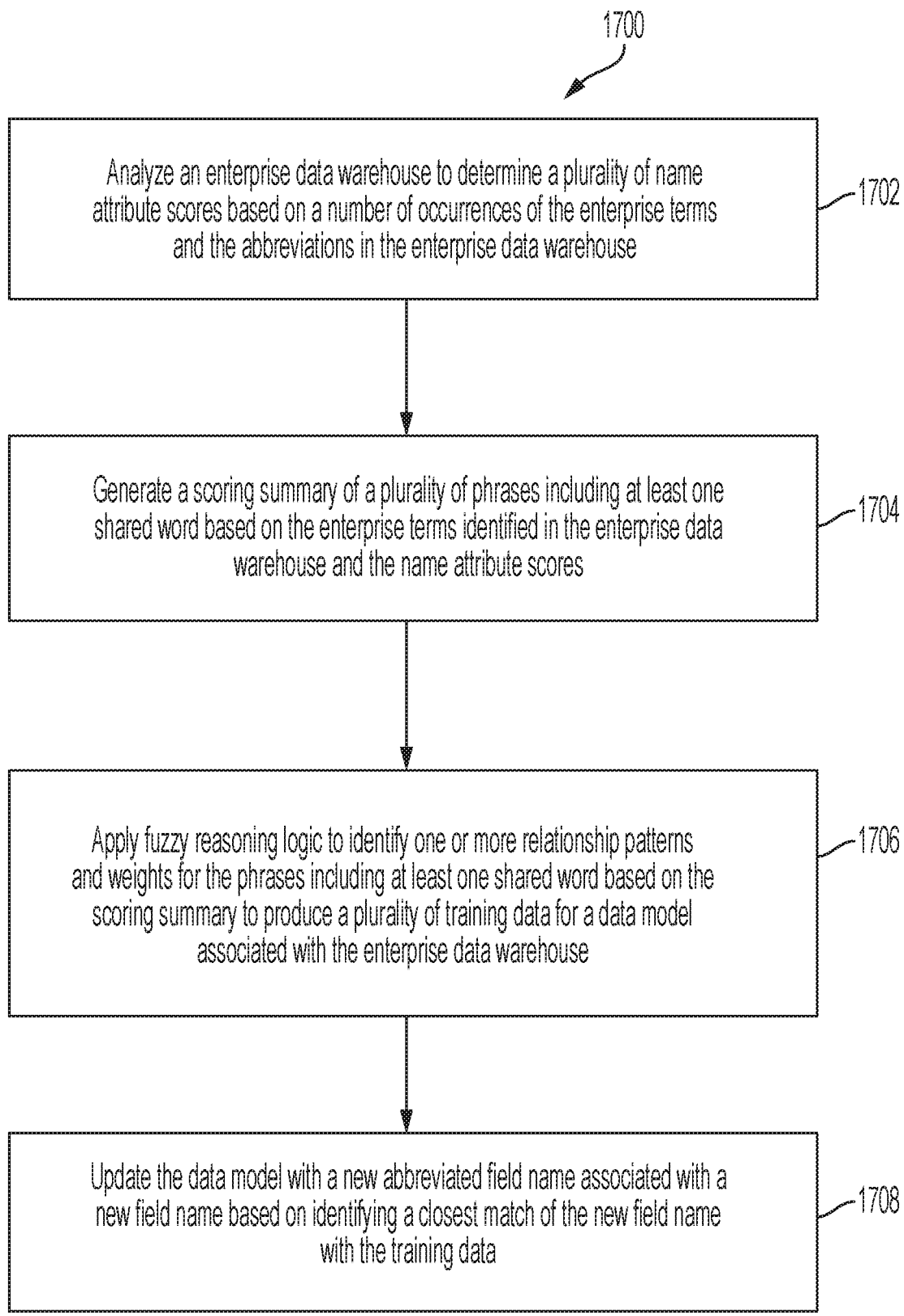
FIG. 17 depicts a process flow according to some embodiments of the present invention.

Turning now to FIG. 17, a process flow 1700 is depicted according to an embodiment. The process flow 1700 includes a number of steps that may be performed in the depicted sequence or in an alternate sequence. The process flow 1700 may be performed by the system 100 of FIG. 1, for instance, using one or more processing systems or processing device 205 of FIG. 2. The process flow 1700 is described in reference to FIGS. 1-17.

At block 1702, the enterprise data warehouse 120 can be analyzed to determine a plurality of name attribute scores 708 based on a number of occurrences of the enterprise terms (e.g., enterprise attributes 702) and the abbreviations in the enterprise data warehouse 120. The enterprise data warehouse 120 can include a plurality of databases 122 and metadata 125 defining one or more aspects of data within the databases 122. For example, metadata 125 can include database schema information that defines how tables 124 are structured and/or related. Databases 116 and databases 122 can have at least one difference in field formats, where the field formats may represent columns of data in tables 124.

At block 1704, a scoring summary 138 of a plurality of phrases including at least one shared word can be generated based on the enterprise terms identified in the enterprise data warehouse 120 and the name attribute scores 708. At block 1706, fuzzy reasoning logic can be applied to identify one or more relationship patterns and weights for the phrases including at least one shared word based on the scoring summary 138 to produce a plurality of training data 136 for a data model 130 associated with the enterprise data warehouse 120. At block 1708, the data model 130 can be updated with a new abbreviated field name associated with a new field name based on identifying a closest match of the new field name with the training data 136.

In embodiments, the data modeling servers 102 can receive a request to update the data model 130 to include the new field name associated with a new or updated column of data for the tables 124. The enterprise data warehouse 120 can be searched to confirm whether an existing field name matches the new field name. Embodiments can also determine whether a field attribute change is requested based on matching the new field name with the existing field name. A data definition language file associated with the data model 130 can be updated based on identifying the field attribute change.

In embodiments, a data source identifier can be received by the data modeling tool 134 as part of an update or creation of the data model 130. A database schema comparison can be performed to identify one or more differences between a source database of databases 116 and a target database of databases 122 based on determining that the data source identifier indicates a database source type. A field name and a data type associated with the one or more differences can be identified. The field name associated with the one or more differences can be checked with respect to a plurality of formatting rules as part of the rules 137. An abbreviation to the field name can be applied based on the training data 136 and the formatting rules. A data definition language file can be generated for the target database based on the field name, the abbreviation of the field name, and the data type.

In embodiments, a data source identifier can be received at the data modeling tool 134. Mapping document 126 can be parsed to identify one or more differences with respect to an existing mapping document (e.g., an earlier version of mapping document 126) based on determining that the data source identifier indicates a mapping document source type. A field name and a data type associated with the one or more differences can be identified. The data modeling tool 134 can determine whether an existing abbreviation of the field name is found in the enterprise abbreviation list 128 and create an abbreviation of the field name based on identifying a matching entry in the enterprise abbreviation list 128. The abbreviation of the field name can be created based on the training data 136 in response to a failure to identify the matching entry in the enterprise abbreviation list 128. A data definition language file can be generated for a target database of the databases 122 based on the field name, the abbreviation of the field name, and the data type. A plurality of word groupings can be identified in the field name. A plurality of combinations of the word groupings can be formed for abbreviating the field name. The abbreviation of the field name can be determined based on matching at least one of the combinations with the enterprise abbreviation list 128. The scoring summary 138 can be determined for the combinations of the word groupings. The abbreviation of the field name can be selected based on the scoring summary 138 for the combinations of the word groupings. The field name associated with the one or more differences can be checked with respect to a plurality of formatting rules as part of the rules 137. The abbreviation to the field name can be applied based on the training data 136 and the formatting rules.

In embodiments, the mapping document 126 can be generated including a source to target mapping of at least one field name, description, and data type for an update of the data model 130 at a target database of the databases 122 of the enterprise data warehouse 120. A field name can be derived based on the description in response to determining that the field name is missing in the target database. A plurality of enterprise domains can be identified associated with different instances of the enterprise abbreviation list 128. An abbreviation of the field name can be determined based on comparing abbreviation data across the enterprise domains.

In embodiments, a plurality of abbreviation options can be derived by applying a plurality of abbreviation rules as part of rules 137 to a phrase based on a failure to locate a corresponding abbreviation in the enterprise abbreviation list 128. One of abbreviation options can be selected as a derived abbreviation based on confirming that the derived abbreviation is unique with respect to the enterprise abbreviation list 128. The derived abbreviation can be compared to a maximum character length limit. The derived abbreviation can be parsed into a plurality of abbreviated words based on determining that the derived abbreviation exceeds the maximum character length limit. The enterprise data warehouse 120 can be analyzed to determine a plurality of derived abbreviation scores based on a number of occurrences of the abbreviated words and combinations of the abbreviated words in the enterprise data warehouse 120. The derived abbreviation can be modified to drop one or more characters based on the derived abbreviation scores. The abbreviation options can be output to a user interface, such as user interfaces 1200 and 1300. The derived abbreviation can be confirmed based on a selection through the user interface. The enterprise abbreviation list 128 can be updated with the derived abbreviation based on a request received through the user interface.

In embodiments, a source database selection and a source schema selection associated with the data model 130 can be selected through a user interface, such as user interfaces 1500 and 1600. A target database selection and a target schema selection associated with the data model can also be received through the user interface. A data definition language file can be generated based on one or more updates to the data model 130 to map a change between from the source database selection and the source schema selection to the target database selection and the target schema selection.

Technical effects include automating data modeling and mapping from various data sources to an enterprise data warehouse. Discovering and learning abbreviations for words and phrases using machine learning can reduce the physical column name sizes used in the enterprise data warehouse to improve storage efficiency and reduce update time.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded on to a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
   a network interface configured to access an enterprise data warehouse and an enterprise abbreviation list that maps a plurality of enterprise terms to abbreviations;
   a processing device in communication with the network interface; and
   a memory device in communication with the processing device, the memory device storing instructions that when executed by the processing device result in:
   analyzing the enterprise data warehouse to determine a plurality of name attribute scores based on a number of occurrences of the enterprise terms and the abbreviations in the enterprise data warehouse;
   generating a scoring summary of a plurality of phrases comprising at least one shared word based on the enterprise terms identified in the enterprise data warehouse and the name attribute scores;
   applying fuzzy reasoning logic to identify one or more relationship patterns and weights for the phrases comprising at least one shared word based on the scoring summary to produce a plurality of training data for a data model associated with the enterprise data warehouse; and
   updating the data model with a new abbreviated field name associated with a new field name based on identifying a closest match of the new field name with the training data.

2. The system of claim 1, wherein the enterprise data warehouse comprises a plurality of databases and metadata defining one or more aspects of data within the databases.

3. The system of claim 2, wherein the databases comprise at least one difference in field formats.

4. The system of claim 1, further comprising instructions that when executed by the processing device result in:
   receiving a request to update the data model to include the new field name; and
   searching the enterprise data warehouse to confirm whether an existing field name matches the new field name.

5. The system of claim 4, further comprising instructions that when executed by the processing device result in:
   determining whether a field attribute change is requested based on matching the new field name with the existing field name; and
   updating a data definition language file associated with the data model based on identifying the field attribute change.

6. The system of claim 1, further comprising instructions that when executed by the processing device result in:
   receiving a data source identifier;
   performing a database schema comparison to identify one or more differences between a source database and a target database based on determining that the data source identifier indicates a database source type;
   identifying a field name and a data type associated with the one or more differences;
   checking the field name associated with the one or more differences with respect to a plurality of formatting rules;
   applying an abbreviation to the field name based on the training data and the formatting rules; and
   generating a data definition language file for the target database based on the field name, the abbreviation of the field name, and the data type.

7. The system of claim 1, further comprising instructions that when executed by the processing device result in:
   receiving a data source identifier;
   parsing a mapping document to identify one or more differences with respect to an existing mapping document based on determining that the data source identifier indicates a mapping document source type;
   identifying a field name and a data type associated with the one or more differences;
   determining whether an existing abbreviation of the field name is found in the enterprise abbreviation list;
   creating an abbreviation of the field name based on identifying a matching entry in the enterprise abbreviation list;
   creating the abbreviation of the field name based on the training data in response to a failure to identify the matching entry in the enterprise abbreviation list; and
   generating a data definition language file for a target database based on the field name, the abbreviation of the field name, and the data type.

8. The system of claim 7, further comprising instructions that when executed by the processing device result in:
   identifying a plurality of word groupings in the field name;
   forming a plurality of combinations of the word groupings for abbreviating the field name; and
   determining the abbreviation of the field name based on matching at least one of the combinations with the enterprise abbreviation list.

9. The system of claim 8, further comprising instructions that when executed by the processing device result in:
   determining the scoring summary for the combinations of the word groupings; and
   selecting the abbreviation of the field name based on the scoring summary for the combinations of the word groupings.

10. The system of claim 7, further comprising instructions that when executed by the processing device result in:
    checking the field name associated with the one or more differences with respect to a plurality of formatting rules; and
    applying the abbreviation to the field name based on the training data and the formatting rules.

11. The system of claim 1, further comprising instructions that when executed by the processing device result in:
    generating a mapping document comprising a source to target mapping of at least one field name, description, and data type for an update of the data model at a target database of the enterprise data warehouse; and
    deriving a field name based on the description in response to determining that the field name is missing in the target database.

12. The system of claim 11, further comprising instructions that when executed by the processing device result in:

23 identifying a plurality of enterprise domains associated with different instances of the enterprise abbreviation list; and determining an abbreviation of the field name based on comparing abbreviation data across the enterprise domains.

13. The system of claim 1, further comprising instructions that when executed by the processing device result in:

deriving a plurality of abbreviation options by applying a plurality of abbreviation rules to a phrase based on a failure to locate a corresponding abbreviation in the enterprise abbreviation list; and selecting one of the abbreviation options as a derived abbreviation based on confirming that the derived abbreviation is unique with respect to the enterprise abbreviation list.

14. The system of claim 13, further comprising instructions that when executed by the processing device result in:

comparing the derived abbreviation to a maximum character length limit;

parsing the derived abbreviation into a plurality of abbreviated words based on determining that the derived abbreviation exceeds the maximum character length limit;

analyzing the enterprise data warehouse to determine a plurality of derived abbreviation scores based on a number of occurrences of the abbreviated words and combinations of the abbreviated words in the enterprise data warehouse; and modifying the derived abbreviation to drop one or more characters based on the derived abbreviation scores.

15. The system of claim 13, further comprising instructions that when executed by the processing device result in:

outputting the abbreviation options to a user interface;

confirming the derived abbreviation based on a selection through the user interface; and updating the enterprise abbreviation list with the derived abbreviation based on a request received through the user interface.

16. The system of claim 1, further comprising instructions that when executed by the processing device result in:

receiving a source database selection and a source schema selection associated with the data model through a user interface;

receiving a target database selection and a target schema selection associated with the data model through the user interface; and generating a data definition language file based on one or more updates to the data model to map a change between from the source database selection and the source schema selection to the target database selection and the target schema selection.

17. A computer program product comprising a non-transitory computer readable storage medium embodied with computer program instructions that when executed by a computer cause the computer to implement:

analyzing an enterprise data warehouse to determine a plurality of name attribute scores based on a number of occurrences of enterprise terms and abbreviations in the enterprise data warehouse;

generating a scoring summary of a plurality of phrases comprising at least one shared word based on the enterprise terms identified in the enterprise data warehouse and the name attribute scores;

applying fuzzy reasoning logic to identify one or more relationship patterns and weights for the phrases comprising at least one shared word based on the scoring

24 summary to produce a plurality of training data for a data model associated with the enterprise data warehouse; and updating the data model with a new abbreviated field name associated with a new field name based on identifying a closest match of the new field name with the training data.

18. The computer program product of claim 17, further comprising computer program instructions that when executed by the computer cause the computer to implement:

receiving a request to update the data model to include the new field name;

searching the enterprise data warehouse to confirm whether an existing field name matches the new field name;

determining whether a field attribute change is requested based on matching the new field name with the existing field name; and updating a data definition language file associated with the data model based on identifying the field attribute change.

19. The computer program product of claim 17, further comprising computer program instructions that when executed by the computer cause the computer to implement:

receiving a data source identifier;

performing a database schema comparison to identify one or more differences between a source database and a target database based on determining that the data source identifier indicates a database source type;

identifying a field name and a data type associated with the one or more differences;

checking the field name associated with the one or more differences with respect to a plurality of formatting rules;

applying an abbreviation to the field name based on the training data and the formatting rules; and generating a data definition language file for the target database based on the field name, the abbreviation of the field name, and the data type.

20. The computer program product of claim 17, further comprising computer program instructions that when executed by the computer cause the computer to implement:

receiving a data source identifier;

parsing a mapping document to identify one or more differences with respect to an existing mapping document based on determining that the data source identifier indicates a mapping document source type;

identifying a field name and a data type associated with the one or more differences;

determining whether an existing abbreviation of the field name is found in the enterprise abbreviation list;

creating an abbreviation of the field name based on identifying a matching entry in the enterprise abbreviation list;

creating the abbreviation of the field name based on the training data in response to a failure to identify the matching entry in the enterprise abbreviation list; and generating a data definition language file for a target database based on the field name, the abbreviation of the field name, and the data type.

21. The computer program product of claim 20, further comprising computer program instructions that when executed by the computer cause the computer to implement:

identifying a plurality of word groupings in the field name;

forming a plurality of combinations of the word groupings for abbreviating the field name; and determining the abbreviation of the field name based on matching at least one of the combinations with the enterprise abbreviation list.

22. The computer program product of claim 17, further comprising computer program instructions that when executed by the computer cause the computer to implement:
generating a mapping document comprising a source to target mapping of at least one field name, description, and data type for an update of the data model at a target database of the enterprise data warehouse;
deriving a field name based on the description in response to determining that the field name is missing in the target database;
identifying a plurality of enterprise domains associated with different instances of the enterprise abbreviation list; and
determining an abbreviation of the field name based on comparing abbreviation data across the enterprise domains.

23. The computer program product of claim 17, further comprising computer program instructions that when executed by the computer cause the computer to implement:
deriving a plurality of abbreviation options by applying a plurality of abbreviation rules to a phrase based on a failure to locate a corresponding abbreviation in the enterprise abbreviation list; and
selecting one of the abbreviation options as a derived abbreviation based on confirming that the derived abbreviation is unique with respect to the enterprise abbreviation list.

24. The computer program product of claim 17, further comprising computer program instructions that when executed by the computer cause the computer to implement:
receiving a source database selection and a source schema selection associated with the data model through a user interface;
receiving a target database selection and a target schema selection associated with the data model through the user interface; and
generating a data definition language file based on one or more updates to the data model to map a change between from the source database selection and the source schema selection to the target database selection and the target schema selection.

* * * * *